(12) United States Patent
Ichida

(10) Patent No.: US 12,523,258 B2
(45) Date of Patent: Jan. 13, 2026

(54) ASSEMBLY OF GEAR AND ROTATING SHAFT, AND ASSEMBLY METHOD THEREFOR

(71) Applicant: NSK LTD., Tokyo (JP)

(72) Inventor: Seiji Ichida, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/029,245

(22) PCT Filed: Mar. 11, 2022

(86) PCT No.: PCT/JP2022/011026
§ 371 (c)(1),
(2) Date: Mar. 29, 2023

(87) PCT Pub. No.: WO2022/196569
PCT Pub. Date: Sep. 22, 2022

(65) Prior Publication Data
US 2023/0366436 A1    Nov. 16, 2023

(30) Foreign Application Priority Data
Mar. 15, 2021   (JP) .................. 2021-041404

(51) Int. Cl.
*F16H 57/00*  (2012.01)
*F16D 1/072*  (2006.01)
(Continued)

(52) U.S. Cl.
CPC .......... *F16D 1/072* (2013.01); *F16D 1/0858* (2013.01); *F16H 57/0025* (2013.01); *H02K 7/1166* (2013.01); *B62D 5/0454* (2013.01)

(58) Field of Classification Search
CPC .. F16H 57/0025; F16D 1/0858; F16D 1/0876; F16D 2001/103
See application file for complete search history.

(56) References Cited

U.S. PATENT DOCUMENTS 2,082,379 A * 6/1937 Brittain, Jr. ........... F16D 1/0858
403/333
8,944,694 B2 * 2/2015 Fukumura ........... B60B 27/0084
384/589
(Continued)

FOREIGN PATENT DOCUMENTS

CN   1643266 A    7/2005
CN   105452663 A   3/2016
(Continued)

OTHER PUBLICATIONS

International Search Report for PCT/JP2022/011026 dated May 17, 2022.
(Continued)

*Primary Examiner* — Minnah L Seoh
*Assistant Examiner* — Gregory T Prather
(74) *Attorney, Agent, or Firm* — Sughrue Mion, PLLC

(57) ABSTRACT

An assembly of a gear and rotating shaft, comprising: a gear having teeth on an outer peripheral surface thereof, and a center hole penetrating in an axial direction through a center portion thereof; and a rotating shaft including a serrated shaft portion having a male serration portion on an outer peripheral surface thereof and press-fitted into the center hole, and a guide shaft portion provided adjacent to one side in the axial direction of the serrated shaft portion and having an outer diameter capable of being internally fitted in the center hole with a clearance fit.

5 Claims, 16 Drawing Sheets

(51) Int. Cl.
  *F16D 1/08* (2006.01)
  *H02K 7/116* (2006.01)
  *B62D 5/04* (2006.01)

(56) References Cited

U.S. PATENT DOCUMENTS

| | | | |
|---|---|---|---|
| 2003/0033899 A1* | 2/2003 | Prucher | F16D 1/06 74/403 |
| 2004/0063506 A1* | 4/2004 | Ichikawa | F16D 1/06 464/182 |
| 2006/0075838 A1* | 4/2006 | Hacker | F16D 1/072 29/447 |
| 2008/0028612 A1* | 2/2008 | Shirokoshi | F16D 1/072 29/893.1 |
| 2008/0069636 A1* | 3/2008 | Saito | F16D 1/0858 403/359.1 |
| 2010/0331093 A1 | 12/2010 | Ozawa et al. | |
| 2012/0282020 A1* | 11/2012 | Hebrard | F16H 57/0025 29/893.1 |
| 2013/0172088 A1* | 7/2013 | Umekida | B60B 27/0042 403/359.1 |
| 2016/0146205 A1 | 5/2016 | Isoda et al. | |
| 2017/0211630 A1* | 7/2017 | Tavener | F16D 1/0858 |
| 2023/0043740 A1* | 2/2023 | Hong | H02K 7/08 |

FOREIGN PATENT DOCUMENTS

| | | |
|---|---|---|
| JP | 2009-68582 A | 4/2009 |
| JP | 2013-119890 A | 6/2013 |
| JP | 2014-20381 A | 2/2014 |
| JP | 2015-36266 A | 2/2015 |

OTHER PUBLICATIONS

Chinese Office Action issued in CN Appln No. 202280007424.3 dated Apr. 30, 2025.

* cited by examiner

--Prior Art--

--Prior Art--

ASSEMBLY OF GEAR AND ROTATING SHAFT, AND ASSEMBLY METHOD THEREFOR

This Application is a National Stage of International Application No. PCT/JP2022/011026 filed Mar. 11, 2022, claiming priority based on Japanese Patent Application No. 2021-041404 filed Mar. 15, 2021.

TECHNICAL FIELD

The present invention relates to an assembly of a gear and a rotating shaft, such as an assembly of a worm wheel and a pinion shaft, and an assembly method therefor.

BACKGROUND ART

Electric power steering devices using an electric motor as an auxiliary power source are widely used as a device for reducing force required to operate a steering wheel when applying a steering angle to steered wheels of an automobile. Electric power steering devices are roughly classified according to a mounting position of an electric motor as: a column-assist type that applies auxiliary power to a steering shaft that is rotatably supported inside a steering column; a pinion-assist type that applies auxiliary power to a pinion shaft, which is an input shaft of a steering gear unit; a dual-pinion type, in which a pinion shaft separate from the pinion shaft that is the input shaft is provided in the steering gear unit, that applies auxiliary power to the pinion shaft; and the like. In either structure, auxiliary power of the electric motor is applied through a speed reducer to a shaft member that rotates or moves linearly in accordance with the operation of the steering wheel. A worm speed reducer is widely used as such a speed reducer. A worm speed reducer of an electric power steering device includes a worm that is rotationally driven by an electric motor, and a worm wheel that engages with the worm.

FIG. 15 and FIG. 16 illustrate a pinion assist type electric power steering device 100 as described in JP 2013-119890 A. In the electric power steering device 100, rotation of a steering wheel 101 is transmitted to a pinion shaft 106 of a steering gear unit 105 through a steering shaft 102, an intermediate shaft 103, and a pair of universal joints 104a, 104b. When a rack shaft 107 of the steering gear unit 105 displaces in the axial direction as the pinion shaft 106 rotates, a pair of tie rods 108 connected to end portions on both sides in the axial direction of the rack shaft 107 are pushed and pulled, which applies a steering angle to a pair of steered wheels 109.

In the pinion-assist type electric power steering device 100, torque of an electric motor 110 is applied to the pinion shaft 106 through a worm speed reducer 111 in order to reduce a force required for a driver to operate the steering wheel 101. The worm speed reducer 111 includes a worm 112 and a worm wheel 113.

The worm 112 has a screw-like worm tooth 114 on an outer peripheral surface thereof and is rotationally driven by the electric motor 110.

The worm wheel 113, on an outer peripheral surface thereof, has wheel teeth 115 that engage with the worm tooth 114, and has a center hole 116 with a constant inner diameter penetrating in the axial direction though a center portion thereof. The worm wheel 113 is connected and fixed to the pinion shaft 106 by press-fitting an intermediate portion in the axial direction of the pinion shaft 106 into the center hole 116.

The pinion shaft 106, in a portion on one side in the axial direction of the intermediate portion in the axial direction that is press-fitted into the center hole 116 of the worm wheel 113 (upper side portion in FIG. 16), includes a cylindrical shaft portion 117, the outer peripheral surface of which is a cylindrical surface centered on the central axis of the pinion shaft 106, and, in a portion on the other side in the axial direction (lower portion in FIG. 16), includes a serrated shaft portion 118 having a male serration portion on an outer peripheral surface thereof. In a state before the intermediate portion in the axial direction of the pinion shaft 106 is press-fitted into the center hole 116 of the worm wheel 113, an outer diameter of the cylindrical shaft portion 117 is larger than an inner diameter of the center hole 116, and an outer diameter of the serrated shaft portion 118, that is, an addendum circle diameter of the serration teeth forming the male serration portion provided on the outer peripheral surface of the serrated shaft portion 118, is larger than the outer diameter of the cylindrical shaft portion 117.

When connecting and fixing the pinion shaft 106 and the worm wheel 113, the pinion shaft 106, which is the rotating shaft, is inserted into the center hole 116 of the worm wheel 113, which is a gear, with an end portion on the one side in the axial direction as a leading end. After the cylindrical shaft portion 117 is press-fitted into the center hole 116, the pinion shaft 106 is further displaced to the one side in the axial direction with respect to the worm wheel 113, and by press-fitting the serrated shaft portion 118 into the center hole 116, the strength of the connection between the pinion shaft 106 and the worm wheel 113 is ensured.

CITATION LIST

Patent Literature

Patent Literature 1: JP 2013-119890 A

SUMMARY OF INVENTION

Technical Problem

In the electric power steering device 100 described in JP 2013-119890 A, there is room for further improvement from an aspect of ensuring that engagement between the worm tooth 114 of the worm 112 and the wheel teeth 115 of the worm wheel 113 is in a proper state.

In the electric power steering device 100 described in JP 2013-119890 A, when connecting and fixing the pinion shaft 106, which is the rotating shaft, and the worm wheel 113, which is the gear, the cylindrical shaft portion 117 is first press-fitted into the center hole 116, which aligns the pinion shaft 106 with respect to the worm wheel 113.

Therefore, in a case where in the initial stage of the operation of press-fitting the cylindrical shaft portion 117 into the center hole 116 in order to align the pinion shaft 106 with respect to the worm wheel 113, the central axis of the pinion shaft 106 becomes inclined or deviates from the central axis of the worm wheel 113, there is a possibility that after that it will not be possible to correct the inclination and/or deviation of the central axis of the pinion shaft 106 with respect to the central axis of the worm wheel 113. That is, there is a possibility that the pinion shaft 106 and the worm wheel 113 will be connected and fixed with the central axis of the pinion shaft 106 being inclined or deviated from the central axis of the worm wheel 113.

In a case where the central axis of the pinion shaft 106 becomes inclined or deviates with respect to the central axis of the worm wheel 113, there is a possibility that resistance to engagement between the worm tooth 114 and the wheel teeth 115 will increase, that noise will occur at the engagement portion between the worm tooth 114 and the wheel teeth 115, or the like. Therefore, in the electric power steering device 100 described in JP 2013-119890 A, before starting the work of press-fitting the cylindrical shaft portion 117 into the center hole 116, it is necessary that the pinion shaft 106 and the worm wheel 113 be aligned with high accuracy, which is troublesome.

In addition, in the electric power steering device 100 described in JP 2013-119890 A, a dimensional tolerance of the center hole 116 of the worm wheel 113 and a dimensional tolerance of the cylindrical shaft portion 117 and the serrated shaft portion 118 of the pinion shaft 106 must be regulated with precision. The reason for this is as described below.

In the electric power steering device 100 described in JP 2013-119890 A, both the cylindrical shaft portion 117 for performing axial alignment with the worm wheel 113, and the serrated shaft portion 118 for ensuring the strength of the connection with the worm wheel 113 are press-fitted into the center hole 116. Therefore, in a state before the cylindrical shaft portion 117 is press-fitted into the center hole 116, the outer diameter $D_{117}$ of the cylindrical shaft portion 117 is slightly larger than the inner diameter $d_{116}$ of the central hole 116 ($D_{117} > d_{116}$). In addition, when the height of the serration teeth of the male serration portion provided on the outer peripheral surface of the serrated shaft portion 118, that is, the tooth height, is taken to be t, the outer diameter of the serrated shaft portion 118, that is, the addendum circle diameter $D_{118}$ of the serration teeth, is approximately equal to the sum of the outer diameter $D_{117}$ of the cylindrical shaft portion 117 and twice the height t of the serration teeth ($D_{118} \approx D_{117} + 2t$). Therefore, in a case where the inner diameter $d_{116}$ of the center hole 116 is too small, it becomes difficult to press-fit the serrated shaft portion 118.

Accordingly, in order to make it possible for both the cylindrical shaft portion 117 and the serrated shaft portion 118 of the pinion shaft 106 to be press-fitted into the center hole 116, the dimensional tolerance of the center hole 116 and the dimensional tolerance of the cylindrical shaft portion 117 and the serrated shaft portion 118 must be regulated with high accuracy, which increases the cost.

Note that when the height t of the serration teeth is reduced, it is not necessary to accurately regulate the dimensional tolerance of the center hole 116 and the dimensional tolerance of the cylindrical shaft portion 117 and the serrated shaft portion 118; however, there is a possibility that an effect of preventing creep of the worm wheel 113 with respect to the pinion shaft 106 cannot be ensured.

The present invention has been made to solve the above problems, but is not limited thereto. It is an object of the present invention to ensure good coaxiality between a gear and a rotating shaft in an assembly of a gear and a rotating shaft, such as an assembly of a worm wheel and a pinion shaft.

Solution to Problem

An assembly of a gear and a rotating shaft according to one aspect of the present invention includes a gear and a rotating shaft.

The gear has teeth on an outer peripheral surface thereof, and a center hole penetrating in an axial direction through a center portion thereof.

The rotating shaft includes a serrated shaft portion having a male serration portion on an outer peripheral surface thereof and press-fitted into the center hole, and a guide shaft portion provided adjacent to one side in the axial direction of the serrated shaft portion and having an outer diameter capable of being internally fitted in the center hole with a clearance fit.

In the assembly of the gear and the rotating shaft according to one aspect of the present invention, only the serrated shaft portion of the rotating shaft can be internally fitted into the center hole of the gear. That is, the guide shaft portion of the rotating shaft can be positioned further on the one side in the axial direction of the center hole.

Alternatively, at least a portion on the one side in the axial direction of the serrated shaft portion and a portion on the other side in the axial direction of the guide shaft portion may be internally fitted into the center hole of the gear.

In the assembly of the gear and rotating shaft according to one aspect of the present invention, an outer diameter of the guide shaft portion may be made smaller than an inner diameter of the center hole by 0.01% or more to 0.5% or less, and preferably 0.01% or more to 0.2% or less.

In the assembly of the gear and the rotating shaft according to one aspect of the present invention, the rotating shaft may also include, at a portion adjacent to the one side in the axial direction of the guide shaft portion, an auxiliary guide shaft portion having an outer diameter smaller than the outer diameter of the guide shaft portion.

In this case, the outer diameter of the auxiliary guide shaft portion can be made to become smaller as going toward the one side in the axial direction.

In the assembly of the gear and the rotating shaft according to one aspect of the present invention, the center hole has a first chamfered portion at an end portion on the other side in the axial direction of an inner peripheral surface thereof, and a second chamfered portion having a smaller chamfer angle than the first chamfered portion at a portion of the inner peripheral surface adjacent to the one side in the axial direction of the first chamfered portion.

In the assembly of the gear and the rotating shaft according to one aspect of the present invention, the center hole may have a small diameter portion at a portion on the one side in the axial direction, and have a large diameter portion having an inner diameter larger than an inner diameter of the small diameter portion at a portion on the other side in the axial direction. In this case, the serrated shaft portion is press-fitted into the large diameter portion, and the guide shaft portion is internally fitted into the small diameter portion with a clearance fit.

In the assembly of the gear and rotating shaft according to one aspect of the present invention, the guide shaft portion may have a male serration portion on an outer peripheral surface thereof.

In the assembly of the gear and the rotating shaft according to one aspect of the present invention, the gear may include a hub having the center hole at a center portion thereof, and a synthetic resin gear portion having the teeth on an outer peripheral surface thereof and connected and fixed to the hub so as to cover an end portion on an outer side in a radial direction of the hub.

In the assembly of the gear and the rotating shaft according to one aspect of the present invention, the gear may be configured by a worm wheel. That is, each of the teeth may be formed by wheel teeth that engage with a screw-like shaped worm tooth provided on a worm.

A method for assembling an assembly of a gear and a rotating shaft according to one aspect of the present invention, in order to assemble an assembly of a gear and a rotating shaft according to one aspect of the present invention includes: aligning the rotating shaft with respect to the gear by inserting the rotating shaft into the center hole of the gear from the other side in the axial direction of the center hole with an end portion on the one side in the axial direction of the rotating shaft leading and internally fitting the guide shaft portion into the center hole with a clearance fit; then connecting the gear and the rotating shaft by press-fitting the serrated shaft portion into the center hole.

Effect of Invention

With the assembly of the gear and the rotating shaft according to one aspect of the present invention, it is possible to achieve a structure that facilitates ensuring good coaxiality between the gear and the rotating shaft.

DESCRIPTION OF EMBODIMENTS

First Example

Figure 1:
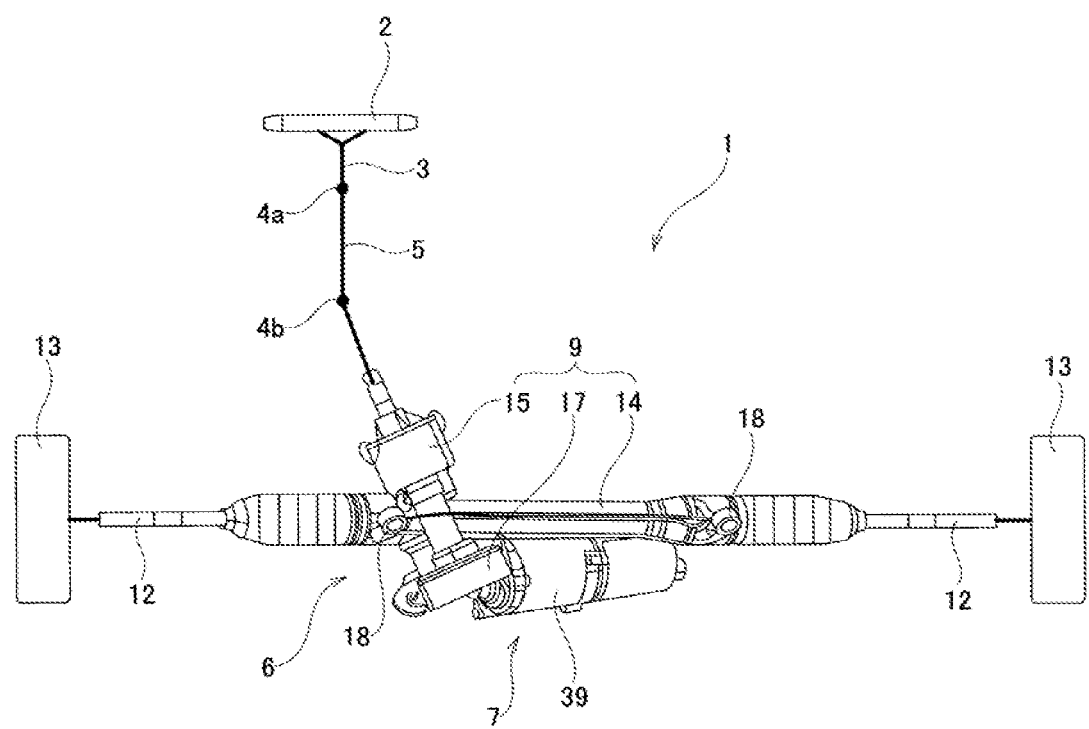
FIG. 1 is a schematic diagram illustrating an electric power steering device including an assembly of a worm wheel (gear) and a pinion shaft (rotating shaft) according to a first example of an embodiment of the present invention.
Figure 2:
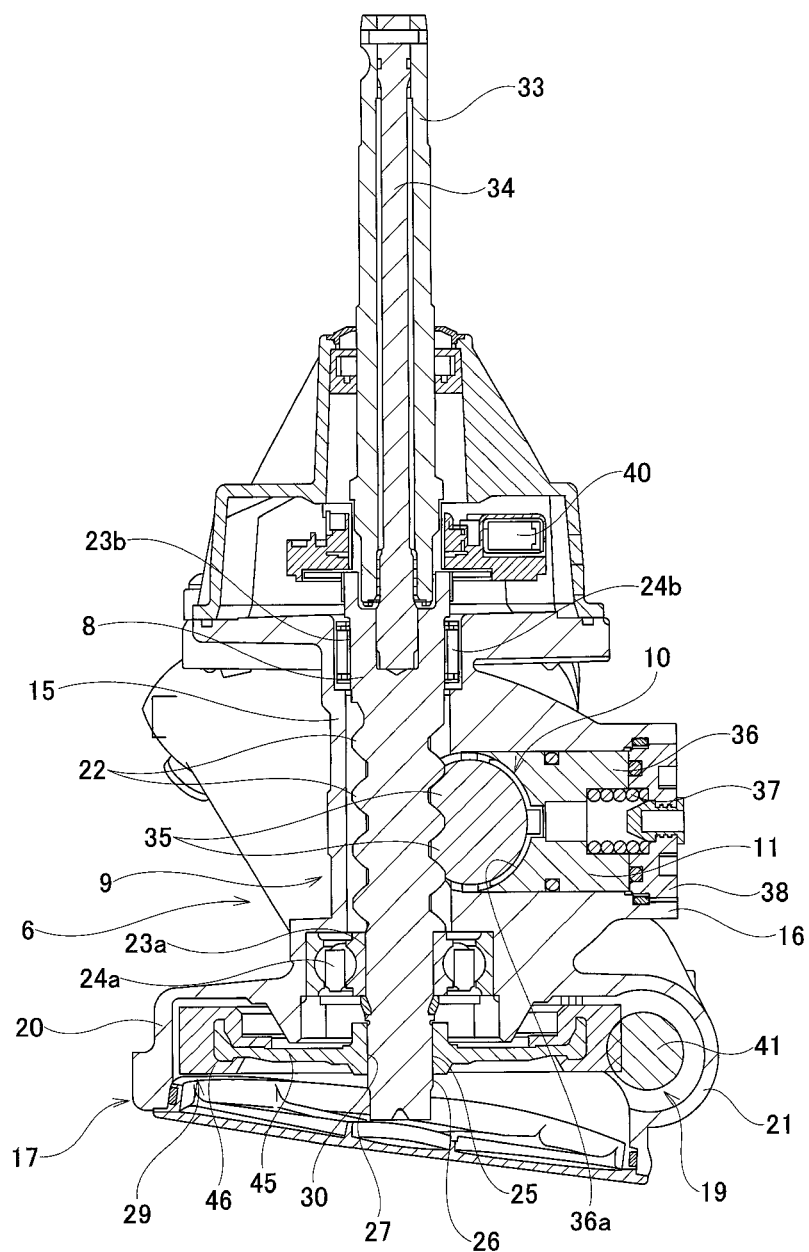
FIG. 2 is a cross-sectional view of main parts, and illustrates the electric power steering device according to the first example.

FIG. 1 to FIG. 6 illustrate a first example of an embodiment of the present invention. This example is an example in which an assembly of a gear and a rotating shaft and an assembly method thereof according to one aspect of the present invention are applied to an assembly 50 of a pinion shaft 8 of a steering gear unit 6 of a pinion-assist type electric power steering device 1 and a worm wheel 29 of a worm speed reducer 19, and an assembly method thereof.

In the following description, the front-rear direction means the front-rear direction of a vehicle, the up-down direction means the up-down direction of the vehicle, and the left-right direction means the width direction of the vehicle. The left-right direction coincides with the axial direction of the rack shaft 10 and the axial direction of a rack housing portion 14, which will be described later. One side in the axial direction of the rack shaft 10 and the axial direction of the rack housing portion 14 refers to the left side in FIG. 1, and the other side in the axial direction of the rack shaft 10 and the axial direction of the rack housing portion 14 refers to the right side in FIG. 1. In the present example, the up-down direction coincides with the width direction of the rack shaft 10.

The electric power steering device 1 of this example includes a steering wheel 2, a steering shaft 3, two universal joints 4a and 4b, an intermediate shaft 5, a steering gear unit 6, and an electric assist device 7.

The steering shaft 3 is rotatably supported inside a steering column (not illustrated) supported by a vehicle body. A steering wheel 2 that is steered by a driver is attached to an end portion on a rear side of the steering shaft 3. An end portion on the front side of the steering shaft 3 is connected to the pinion shaft 8 of the steering gear unit 6 through the universal joint 4a, the intermediate shaft 5, the other universal joint 4b, and a hollow shaft 33 and a torsion bar 34 that will be described later. Therefore, the rotational motion of the steering wheel 2 is transmitted to the pinion shaft 8.

The steering gear unit 6 includes a housing 9, a pinion shaft 8, a rack shaft 10, and a rack guide 11. The rotational motion of the pinion shaft 8 is converted by the steering gear unit 6 into linear motion in the axial direction of the rack shaft 10. As a result, a pair of tie rods 12 connected to the end portions on both sides in the axial direction of the rack shaft 10 are pushed and pulled, which applies a steering angle to a pair of left and right steered wheels 13.

The housing 9 includes a rack housing portion 14, a pinion housing portion 15, a guide housing portion 16, and a gear housing portion 17.

The rack housing portion 14 has a cylindrical shape with end portions on both sides in the axial direction opened, and has attachment portions 18 at two positions separated in the axial direction on a front side surface (front side surface in FIG. 1). The rack housing portion 14 is fixed to the vehicle body by fixing members such as bolts and studs inserted through the attachment portions 18, with the axial direction facing in the left-right direction and being substantially parallel, and preferably parallel to the road surface.

The pinion housing portion 15 has a cylindrical shape and is provided on the front side of the rack housing portion 14 and at a portion on the one side in the axial direction of the rack housing portion 14 so as to extend in the up-down direction. The central axis of the pinion housing portion 15 and the central axis of the rack housing portion 14 are in a skewed positional relationship. Note that in this example, the central axis of the pinion housing portion 15 and the central axis of the rack housing portion 14 obliquely intersect when viewed from the front-rear direction. In other words, the central axis of the pinion housing portion 15 and the central axis of the rack housing portion 14 form an acute angle. An internal space of the pinion housing portion 15 communicates with an internal space of the rack housing portion 14.

The guide housing portion 16 has a cylindrical shape, and is provided at a portion on the one side in the axial direction that is at the same position as the pinion housing portion 15 with respect to the axial direction of the rack housing portion 14, with the axial direction facing in the front-rear direction. An internal space of the guide housing portion 16 communicates with the internal space of the rack housing portion 14.

The gear housing portion 17 is a portion that houses a worm speed reducer 19 of an electric assist device 7 to be described later, and includes a wheel housing portion 20 and a worm housing portion 21.

The wheel housing portion 20 has a cylindrical shape and is provided below the pinion housing portion 15 and coaxially with the pinion housing portion 15.

The worm housing portion 21 has a cylindrical shape and is provided on a rear side of the wheel housing portion 20 so as to extend in the left-right direction. The central axis of the worm housing portion 21 and the central axis of the wheel housing portion 20 are in a skewed positional relationship. An internal space of the worm housing portion 21 communicates with an internal space of the wheel housing portion 20.

The pinion shaft 8 has pinion teeth 22 on an outer peripheral surface of an intermediate portion in the axial direction, and cylindrical surface portions 23$a$, 23$b$ on the outer peripheral surfaces of portions on both sides in the axial direction sandwiching the portion provided with the pinion teeth 22. The pinion shaft 8 is rotatably supported inside the pinion housing portion 15 by two bearings 24$a$, 24$b$ so as to be coaxial with the pinion housing portion 15. That is, by externally fitting and fixing inner rings of the two bearings 24$a$, 24$b$ to the cylindrical surface portions 23$a$, 23$b$ of the pinion shaft 8, and internally fitting and fixing respective outer rings thereof to the inner peripheral surface of the pinion housing portion 15, the pinion shaft 8 is rotatably supported inside the pinion housing portion 15.

The axial direction of the pinion shaft 8 coincides with the up-down direction in FIG. 2 to FIG. 6. In this example, regarding the pinion shaft 8 and the worm wheel 29 connected and fixed to the pinion shaft 8, one side in the axial direction refers to a bottom side in FIG. 2 to FIG. 6 which corresponds to the tie end side of the pinion shaft 8, and the other side in the axial direction refers to an upper side in FIG. 2 to FIG. 6 which corresponds to the base end side of the pinion shaft 8.

Of the cylindrical surface portions 23$a$, 23$b$, at a portion further on the one side in the axial direction than the cylindrical surface portion 23$a$ on the one side in the axial direction, the pinion shaft 8 has a serrated shaft portion 25, a guide shaft portion 26, and an auxiliary guide shaft portion 27 in that order from the other side in the axial direction. In other words, the pinion shaft 8 is provided with the serrated shaft portion 25, and the guide shaft portion 26 provided adjacent to the one side in the axial direction of the serrated shaft portion 25. Furthermore, in this example, the pinion shaft 8 is provided with the auxiliary guide shaft portion 27 at a portion adjacent to the guide shaft portion 26 on the one side in the axial direction.

Figure 5:
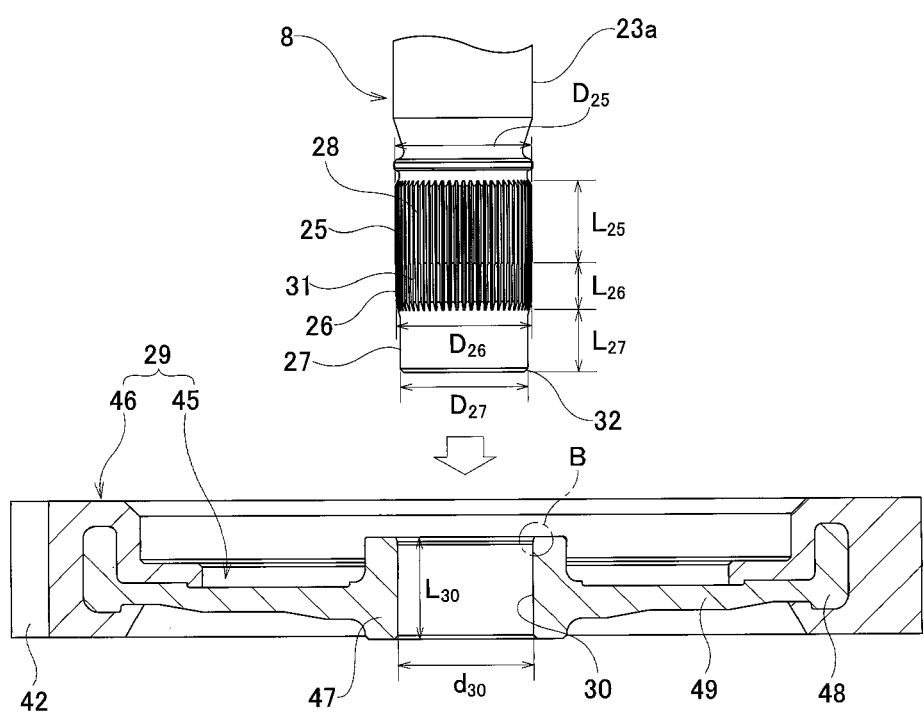
FIG. 5 is an enlarged cross-sectional view of the main parts of the first example, and illustrates a state before the worm wheel and the pinion shaft are connected.
Figure 6:
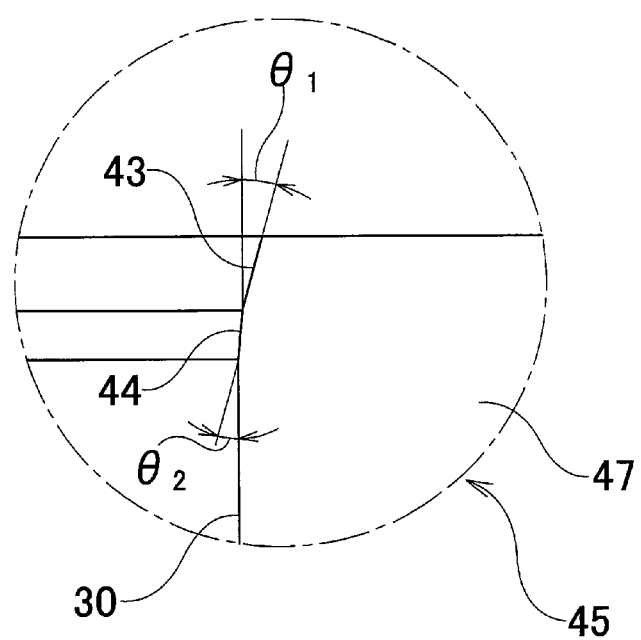
FIG. 6 is an enlarged view of portion B in FIG. 5.

The serrated shaft portion 25 has a male serration portion 28 on an outer peripheral surface thereof. As will be described later, a center hole 30 of the worm wheel 29 of the worm speed reducer 19 is externally fitted and fixed to the serrated shaft portion 25 by an interference fit. That is, the serrated shaft portion 25 is press-fitted into the center hole 30. Therefore, in a state before the serrated shaft portion 25 is press-fitted into the center hole 30 of the worm wheel 29 as illustrated in FIG. 5, the serrated shaft portion 25 has an outer diameter, or in other words, an addendum circle diameter $D_{25}$ of the serration teeth forming the male serration portion 28, that is slightly larger than an inner diameter $d_{30}$ of the center hole 30. More specifically, the outer diameter $D_{25}$ of the serrated shaft portion 25 is larger than the inner diameter $d_{30}$ of the center hole 30 of the worm wheel 29 by 0.5% or more to 1.5% or less, and preferably 0.7% or more to 1.0% or less.

The length $L_{25}$ in the axial direction of the serrated shaft portion 25 is not particularly limited as long as the strength of connection of the pinion shaft 8 to the worm wheel 29 can be ensured. However, the length $L_{25}$ in the axial direction of the serrated shaft portion 25 is preferably equal to or longer than a length in the axial direction of an intermediate portion in the axial direction not including chamfered portions provided at end portions on both sides in the axial direction of the center hole 30 of the worm wheel 29, and specifically, a first chamfered portion 43 and a second chamfered portion 44 provided at an end portion on the other side in the axial direction, and a chamfered portion provided at an end portion on the one side in the axial direction. However, the length $L_{25}$ in the axial direction of the serrated shaft portion 25 can be shorter than the length in the axial direction of the intermediate portion in the axial direction of the center hole 30 as long as the strength of the connection of the pinion shaft 8 to the worm wheel 29 can be ensured. In the illustrated example, the length $L_{25}$ in the axial direction of the serrated shaft portion 25 is approximately 0.8 times the total length $L_{30}$ in the axial direction of the center hole 30 including the chamfered portions provided at the end portions on both sides in the axial direction. Note that an upper limit of the length $L_{25}$ in the axial direction of the serrated shaft portion 25 is regulated based on an aspect of preventing the length in the axial direction of the pinion shaft 8 from becoming excessively long. For the above reason, the length $L_{25}$ in the axial direction of the serrated shaft portion 25 is preferably 1.2 times or less, and more preferably 1 time or less the total length $L_{30}$ in the axial direction of the center hole 30.

As will be described later, when inserting the pinion shaft 8 into the center hole 30 of the worm wheel 29 with the one side in the axial direction leading, the guide shaft portion 26 functions as a guide for aligning the pinion shaft 8 with respect to the worm wheel 29.

The guide shaft portion 26 has a male serration portion 31 on the outer peripheral surface thereof, and has an outer diameter, that is, has an addendum circle diameter $D_{26}$ of the serration teeth forming the male serration portion 31 that allows the guide shaft portion 26 to be fitted in the center hole 30 of the worm wheel 29 with a clearance fit. In other words, the guide shaft portion 26 has an outer diameter $D_{26}$ that allows the guide shaft portion 26 to be internally fitted into the center hole 30 of the worm wheel 29 by spigot fitting, which allows relative displacement in the axial direction, and suppresses looseness in the radial direction as much as possible. More specifically, the outer diameter $D_{26}$ of the guide shaft portion 26 is smaller than the inner diameter $d_{30}$ of the center hole 30 of the worm wheel 29 by 0.01% or more to 0.5% or less, and preferably by 0.01% or more to 0.2% or less.

The length $L_{26}$ in the axial direction of the guide shaft portion 26 is not particularly limited as long as the pinion shaft 8 can be aligned with respect to the worm wheel 29 when inserting the pinion shaft 8 into the center hole 30 of the worm wheel 29; however, the length $L_{26}$ is preferably 0.3 times or more, and even more preferably 0.5 times or more the length $L_{30}$ in the axial direction of the center hole 30 of the worm wheel 29. In the illustrated example, the length $L_{26}$ in the axial direction of the guide shaft portion 26 is approximately 0.4 times the length $L_{30}$ in the axial direction of the center hole of the worm wheel 29. Note that the upper limit of the length $L_{26}$ in the axial direction of the guide shaft portion 26 is also regulated from the aspect of preventing the length in the axial direction of the pinion shaft 8 from becoming excessively long. More specifically, for example, the length $L_{26}$ in the axial direction of the guide shaft portion 26 is preferably 1.0 times or less, and more preferably 0.8 times or less the length $L_{30}$ in the axial direction of the center hole 30.

As will be described later, the auxiliary guide shaft portion 27 functions as an auxiliary guide for roughly aligning the pinion shaft 8 with respect to the worm wheel 29 when inserting the pinion shaft 8 into the center hole 30 of the worm wheel 29 with the one side in the axial direction leading. An outer peripheral surface of the auxiliary guide shaft portion 27 is formed of a cylindrical surface, the outer diameter $D_{27}$ of which does not change in the axial direction, except for a chamfered portion provided at an end portion on the one side in the axial direction.

The auxiliary guide shaft portion 27 has a cylindrical outer peripheral surface centered on the central axis of the pinion shaft 8 and has an outer diameter $D_{27}$ smaller than the outer diameter $D_{26}$ of the guide shaft portion 26. More specifically, the outer diameter $D_{27}$ of the auxiliary guide shaft portion 27 is smaller than the outer diameter $D_{26}$ of the guide shaft portion 26 by 2.0% or more to 10.0% or less, and preferably 4.0% or more to 7.0% or less. The auxiliary guide shaft portion 27 has a chamfered portion 32 on the outer peripheral surface thereof at an end portion on the one side in the axial direction. In this example, the chamfered portion 32 is formed by C-chamfering having a linear generatrix shape.

The length $L_{27}$ in the axial direction of the auxiliary guide shaft portion 27 is not particularly limited as long as the pinion shaft 8 can be roughly aligned with respect to the worm wheel 29 when the pinion shaft 8 is inserted into the center hole 30 of the worm wheel 29; however, the length $L_{27}$ is preferably 0.5 times or more, and more preferably 1.0 times or more the length $L_{30}$ in the axial direction of the center hole 30 of the worm wheel 29. In the illustrated example, the length $L_{27}$ in the axial direction of the auxiliary guide shaft portion 27 is approximately 0.6 times the length $L_{30}$ in the axial direction of the center hole 30 of the worm wheel 29. Note that the upper limit of the length $L_{27}$ in the axial direction of the auxiliary guide shaft portion 27 is also regulated from the aspect of preventing the length in the axial direction of the pinion shaft 8 from becoming excessively long. More specifically, for example, the length $L_{27}$ in the axial direction of the auxiliary guide shaft portion 27 is preferably 2.0 times or less, and more preferably 1.5 times or less the length $L_{30}$ in the axial direction of the center hole 30.

Note that the outer peripheral surface of the serrated shaft portion 25, that is, the tip surface of the serration teeth of the male serration portion 28, and the outer peripheral surface of the guide shaft portion 26, that is, the tip surface of the serration teeth of the male serration portion 31 are connected by an inclined surface whose outer diameter becomes smaller as going toward the one side in the axial direction. In addition, the outer peripheral surface of the guide shaft portion 26 and the outer peripheral surface of the auxiliary guide shaft portion 27 are connected by an inclined surface, the outer diameter of which decreases as going toward the one side in the axial direction.

When manufacturing the pinion shaft 8, the serrated shaft portion 25 having the male serration portion 28 and the guide shaft portion 26 having the male serration portion 31 can be formed, for example, as described below.

First, of the material of the pinion shaft 8, raw male serrations, whose outer diameter, that is, the addendum circle diameter, does not change in the axial direction, are formed by rolling, broaching, or the like on the outer peripheral surface of a portion where the serrated shaft portion 25 and the guide shaft portion 26 are to be formed.

Next, the tips of the teeth of the raw male serrations are polished. At this time, the raw male serrations are processed into the male serration portion 28 of the serrated shaft portion 25 and the male serration portion 31 of the guide shaft portion 26 by polishing the tips of the teeth of a portion of the raw male serrations on the one side in the axial direction more than the tips of the teeth of a portion on the other side in the axial direction. For example, the raw male serrations are polished with a formed grindstone having a stepped cylindrical outer peripheral surface of which an outer diameter of a portion on the one side in the axial direction is larger than an outer diameter of a portion on the other side in the axial direction. In a case where the male serration portion 28 and the male serration portion 31 are machined in this manner, the male serration portion 28 and the male serration portion 31 differ only in the addendum circle diameter, and the root diameter, tooth width and phase are the same as each other.

The end portion on the other side in the axial direction of the pinion shaft 8 is connected to an end portion on the one side in the axial direction of the hollow shaft 33 through the torsion bar 34. An end portion on the other side in the axial direction of the hollow shaft 33 is connected to an end portion on the front side of the steering shaft 3 through the universal joint 4a, the intermediate shaft 5, and the other universal joint 4b. Therefore, the pinion shaft 8 rotates as the steering wheel 2 is operated.

The rack shaft 10 has a columnar shape, and on a portion of the outer peripheral surface, has rack teeth 35 that engage with the pinion teeth 22 of the pinion shaft 8. In this example, the rack shaft has the rack teeth 35 on a front side surface of an intermediate portion in the axial direction.

In a state in which the axial direction of the rack shaft 10 is oriented in the left-right direction and end portions on both sides in the axial direction thereof protrude from the openings on both sides in the left-right direction of the rack housing portion 14, the rack shaft 10 is supported inside the rack housing portion 14 coaxially with the rack housing portion 14 by a rack bushing (not illustrated), that is, a slide bearing or the like, so as to be able to move back-and-forth in the axial direction. The end portions on both sides in the axial direction of the rack shaft 10 are connected to tie rods 12 through spherical joints.

The rack guide 11 has a function of pressing the rack shaft 10 toward the pinion shaft 8. The rack guide 11 includes a pad 36 and an elastic member 37.

The pad 36 has a substantially columnar shape, and is arranged inside the guide housing portion 16 so as to be capable of moving away from and toward the rack shaft 10. The pad 36, on a surface facing the rear side surface of the rack shaft 10, has a concave cylindrical pressing surface 36a having a shape capable of guiding the rear side surface of the rack shaft 10 in the axial direction of the rack shaft 10. The pressing surface 36a is made of synthetic resin or the like having excellent slidability. The elastic member 37 is sandwiched in an elastically compressed state between the pad 36 and a cap 38 covering an opening portion of the guide housing portion 16. As a result, the elastic member 37 presses the pad 36 toward the rack shaft 10. In the illustrated example, the elastic member 37 is composed of a torsion coil spring; however, it may also be composed of a disk spring or the like.

By pressing the rack shaft 10 toward the pinion shaft 8, the rack guide 11 reduces backlash at the engaging portion between the pinion teeth 22 and the rack teeth 35, and prevents the occurrence of abnormal noise at the engaging portion between the pinion teeth 22 and the rack teeth 35.

The electric assist device 7 applies auxiliary power to the pinion shaft 8 to reduce the steering force required for the driver to operate the steering wheel 2. The electric assist device 7 includes a worm speed reducer 19, an electric motor 39 and a torque sensor 40. That is, the electric assist device 7 increases torque of the output shaft of the electric motor 39, or in other words, decelerates the rotation of the output shaft and transmits the torque to the pinion shaft 8.

The worm speed reducer 19 includes a worm wheel 29 and a worm 41.

The worm wheel 29, corresponding to a gear, has wheel teeth 42, corresponding to the teeth, on the outer peripheral surface thereof, and has a center hole 30 penetrating in the axial direction through the center portion. The center hole 30 has a first chamfered portion 43 on an inner peripheral surface of an end portion on the other side in the axial direction, and a second chamfered portion 44 on a portion of the inner peripheral surface adjacent to the one side in the axial direction of the first chamfered portion 43. Both the first chamfered portion 43 and the second chamfered portion 44 are formed by C-chamfering having a linear generatrix shape, and the chamfer angle $\theta_2$ of the second chamfered portion 44 is made smaller than the chamfer angle $\theta_1$ of the first chamfered portion 43. Note that the chamfer angle $\theta_1$ of the first chamfered portion 43 refers to the inclination angle of the generatrix of the first chamfered portion 43 with respect to the central axis of the worm wheel 29, and the chamfer angle $\theta_2$ of the second chamfered portion 44 refers to the inclination angle of the generatrix of the second chamfered portion 44 with respect to the central axis of the worm wheel 29.

The chamfer angle $\theta_1$ of the first chamfered portion 43 is preferably 10.0 degrees or more to 20.0 degrees or less, and more preferably 14.0 degrees or more to 16.0 degrees or less. The chamfer angle $\theta_2$ of the second chamfered portion 44 is smaller than the chamfer angle $\theta_1$ of the first chamfer portion 43, and is preferably 2.5 degrees or more to 7.5 degrees or less, and more preferably 4.0 degrees or more to 6.0 degrees or less.

In this example, the inner peripheral surface of the center hole 30 is configured by a cylindrical surface whose inner diameter does not change in the axial direction, except for at a first chamfered portion 43 and a second chamfered portion 44 provided at the end portion on the other side in the axial direction and a chamfered portion provided at the end portion on the one side in the axial direction.

The worm wheel 29 is connected and fixed to the pinion shaft 8 by press-fitting the serrated shaft portion 25 of the pinion shaft 8 into the center hole 30, and is arranged inside the wheel housing portion 20 of the gear housing portion 17. In this example, in a state in which the pinion shaft 8 and the worm wheel 29 are connected to form the assembly 50, a portion of the pinion shaft 8 from an intermediate portion in the axial direction of the guide shaft portion 26 to the end portion on the other side in the axial direction of the serrated shaft portion 25 is fitted in the center hole 30 of the worm wheel 29. That is, the portion on the other side in the axial direction of the guide shaft portion 26 and the end portion on the one side in the axial direction of the center hole 30 are fitted with a clearance fit with no looseness, and the serrated shaft portion 25 is press-fitted into the portion on the other side in the axial direction of the center hole 30. Note that the portion on the one side in the axial direction of the guide shaft portion 26 is located further on the one side in the axial direction than the opening on the one side in the axial direction of the center hole 30. The serrated shaft portion 25 bites into the inner peripheral surface of the center hole 30.

In this example, the worm wheel 29 includes a hub 45 made of metal and a gear portion 46 made of synthetic resin.

The hub 45 includes an inner diameter side tubular portion 47 having the center hole 30 in a center portion thereof, an outer diameter side tubular portion 48 arranged around the inner diameter side tubular portion 47 so as to be coaxial with the inner diameter side tubular portion 47, and a connecting portion 49 in the form of a hollow circular plate that connects the inner diameter side tubular portion 47 and the outer diameter side tubular portion 48.

The gear portion 46 has the wheel teeth 42 at an end portion on the outer side in the radial direction, and is connected and fixed to the hub 45 so as to cover an end portion on the outer side in the radial direction of the hub 45. That is, the gear portion 46 is formed by injection molding, and more specifically by insert molding, and embeds the outer diameter side tubular portion 48 and the end portion on the outer side in the radial direction of the connecting portion 49 of the hub 45.

The worm 41 has a screw-like worm tooth on the outer peripheral surface thereof that engages with the wheel teeth 42 of the worm wheel 29, and is supported inside the worm housing portion 21 so as to be able to slightly pivot about a base end portion thereof.

The electric motor 39 is such that an output shaft thereof is connected to the base end portion of the worm 41 so as to be able to transmit torque, and is supported and fixed to the worm housing portion 21.

The torque sensor 40 is arranged around the hollow shaft 33 and the pinion shaft 8 and detects the rotational directions of the hollow shaft 33 and the pinion shaft 8 and the torque transmitted between the hollow shaft 33 and the pinion shaft 8. The torque sensor 40 outputs a signal corresponding to the rotational direction of the hollow shaft 33 and pinion shaft 8 and the torque transmitted between hollow shaft 33 and pinion shaft 8 to an electronic control unit of the electric motor 39. In this example, a sensor that detects torque by detecting a phase difference using an encoder is used as the torque sensor 40. However, a non-contact torque sensor using a magnetostrictive effect, for example, may also be used as the torque sensor 40. In this case, the hollow shaft 33 and the torsion bar 34 may be omitted, and the base end portion of the pinion shaft 8 may be directly connected to the universal joint 4b.

The electric assist device 7 drives and controls the electric motor 39 based on the output signal from the torque sensor 40. Thus, the drive torque generated by the electric motor 39 is transmitted to the pinion shaft 8 through the worm speed reducer 19 as a steering assist force. As a result, the steering force required to operate the steering wheel 2 by the driver is reduced.

According to this example, it is possible to ensure good coaxiality between the pinion shaft 8 and the worm wheel 29. The reason for this will be explained below.

As indicated by the arrow in FIG. 5, when connecting the pinion shaft 8 and the worm wheel 29, the pinion shaft 8 is inserted into the center hole 30 of the worm wheel 29 with the one side in the axial direction leading. At the initial stage of the work of inserting the pinion shaft 8 into the center hole 30, the auxiliary guide shaft portion 27 of the pinion shaft 8 is internally fitted into a portion on the other side in the axial direction of the center hole 30 with a clearance fit having a small amount of looseness. As a result, the central axis of the pinion shaft 8 and the central axis of the worm wheel 29 are made to substantially coincide, and the pinion shaft 8 and the worm wheel 29 are roughly aligned.

From a state in which the auxiliary guide shaft portion 27 and the center hole 30 are fitted, the pinion shaft 8 is further displaced toward the one side in the axial direction with respect to the worm wheel 29 to increase the amount of insertion of the pinion shaft 8 into the center hole 30. Thus, the guide shaft portion 26 of the pinion shaft 8 is internally fitted in a portion on the other side in the axial direction of the center hole 30 with no looseness, or in other words, with a clearance fit having less looseness than the fit between the auxiliary guide shaft portion 27 and the center hole 30. As a result, the central axis of the pinion shaft 8 and the central axis of the worm wheel 29 are made to coincide with high accuracy, and the pinion shaft 8 and the worm wheel 29 are aligned with high accuracy.

Figure 3:
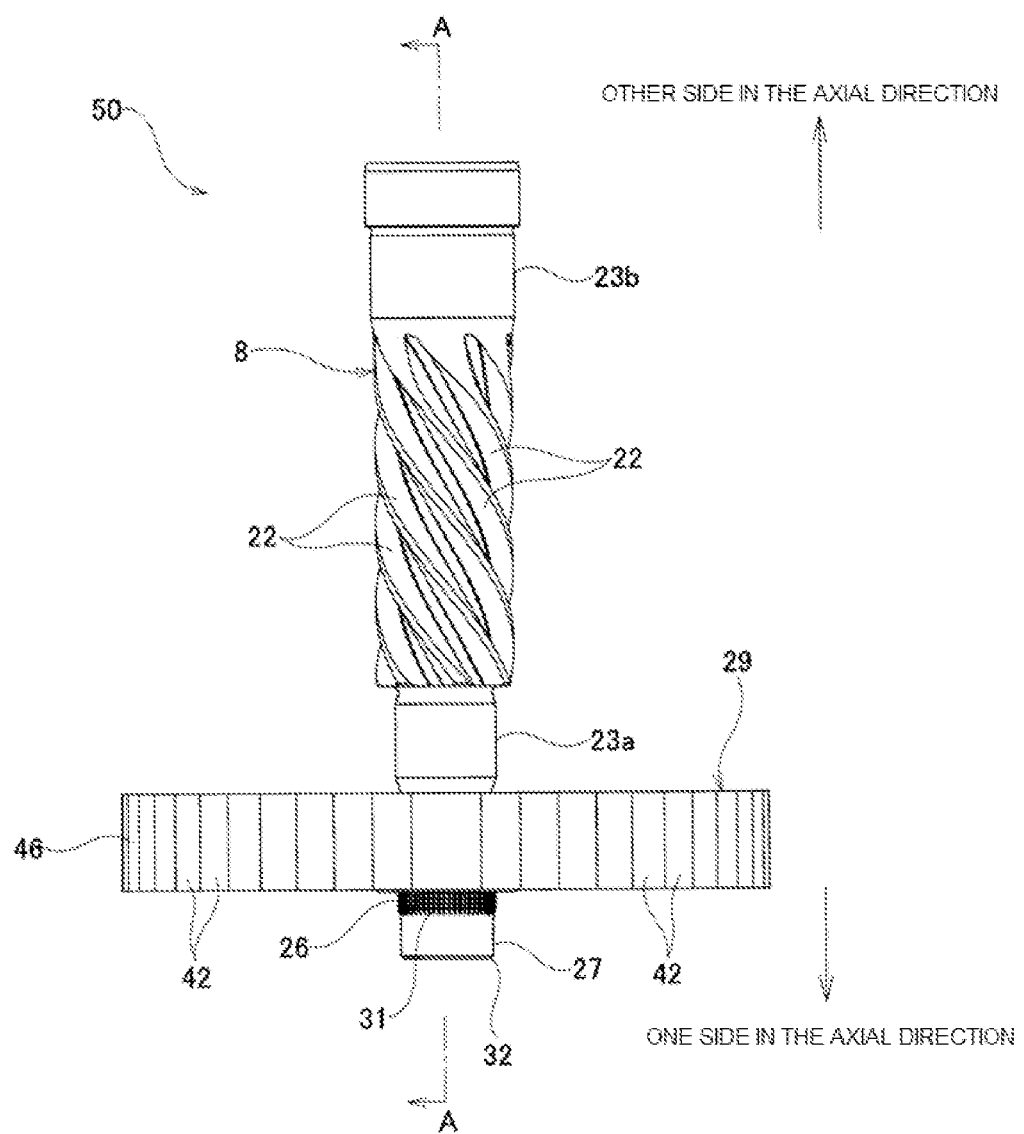
FIG. 3 is a side view illustrating an assembly of a worm wheel and a pinion shaft according to the first example.
Figure 4A:
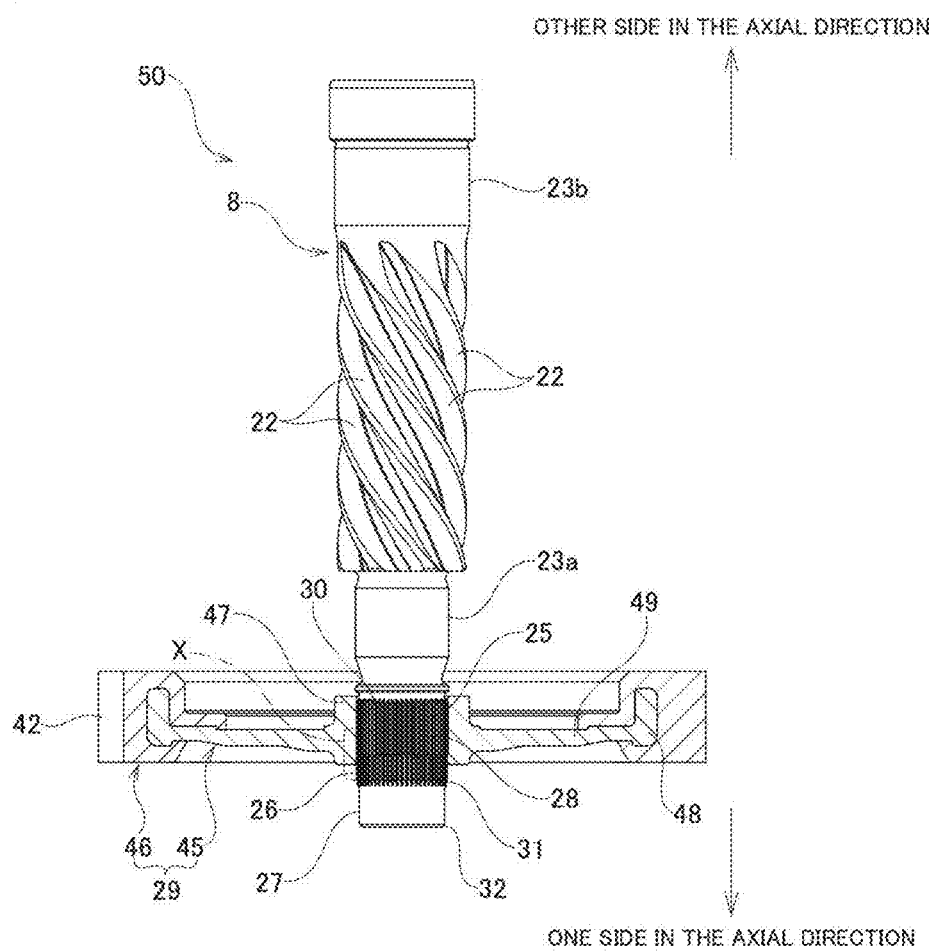
FIG. 4A is a cross-sectional view taken along section line A-A in FIG. 3.
Figure 4B:
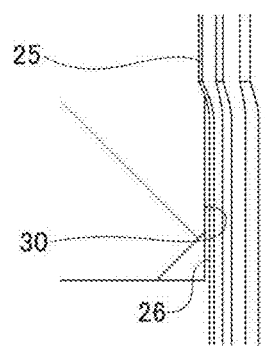
FIG. 4B is an enlarged view of the main parts in FIG. 4A according to the first example.

From a state in which the pinion shaft 8 is axially aligned with the worm wheel 29 by fitting the guide shaft portion 26 with the center hole 30, the pinion shaft 8 is displaced toward the one side in the axial direction with respect to the worm wheel 29, and the amount of insertion of the pinion shaft 8 into the center hole 30 is increased. As a result, by press-fitting the serrated shaft portion 25 of the pinion shaft 8 into the center hole 30, the pinion shaft 8 and the worm wheel 29 are connected to obtain the assembly 50 as illustrated in FIG. 3.

As described above, by fitting the guide shaft portion 26 of the pinion shaft 8 and the center hole 30 of the worm wheel 29 with a clearance fit with no looseness, the worm wheel 29 and the pinion shaft 8 are aligned with high precision. After the worm wheel 29 and the pinion shaft 8 have been aligned with high accuracy in this way, it is possible to start press-fitting of the serrated shaft portion into the center hole 30. In addition, even in a case where the central axis of the pinion shaft 8 is slightly inclined or deviated with respect to the central axis of the worm wheel 29 in a state in which the guide shaft portion 26 is internally fitted in the central hole 30, it is possible, due to the presence of a minute gap between the inner peripheral surface of the center hole 30 and the outer peripheral surface of the guide shaft portion 26 (tip surface of the teeth of the male serration portion 31), to correct the inclination and/or deviation of the central axis of the pinion shaft 8 with respect to the central axis of the worm wheel 29. Accordingly, it is possible to prevent the pinion shaft 8 and the worm wheel 29 from being connected and fixed while the central axis of the pinion shaft 8 is inclined or deviated with respect to the central axis of the worm wheel 29. Therefore, it is easy to ensure coaxiality between the pinion shaft 8 and the worm wheel 29.

Figure 16:
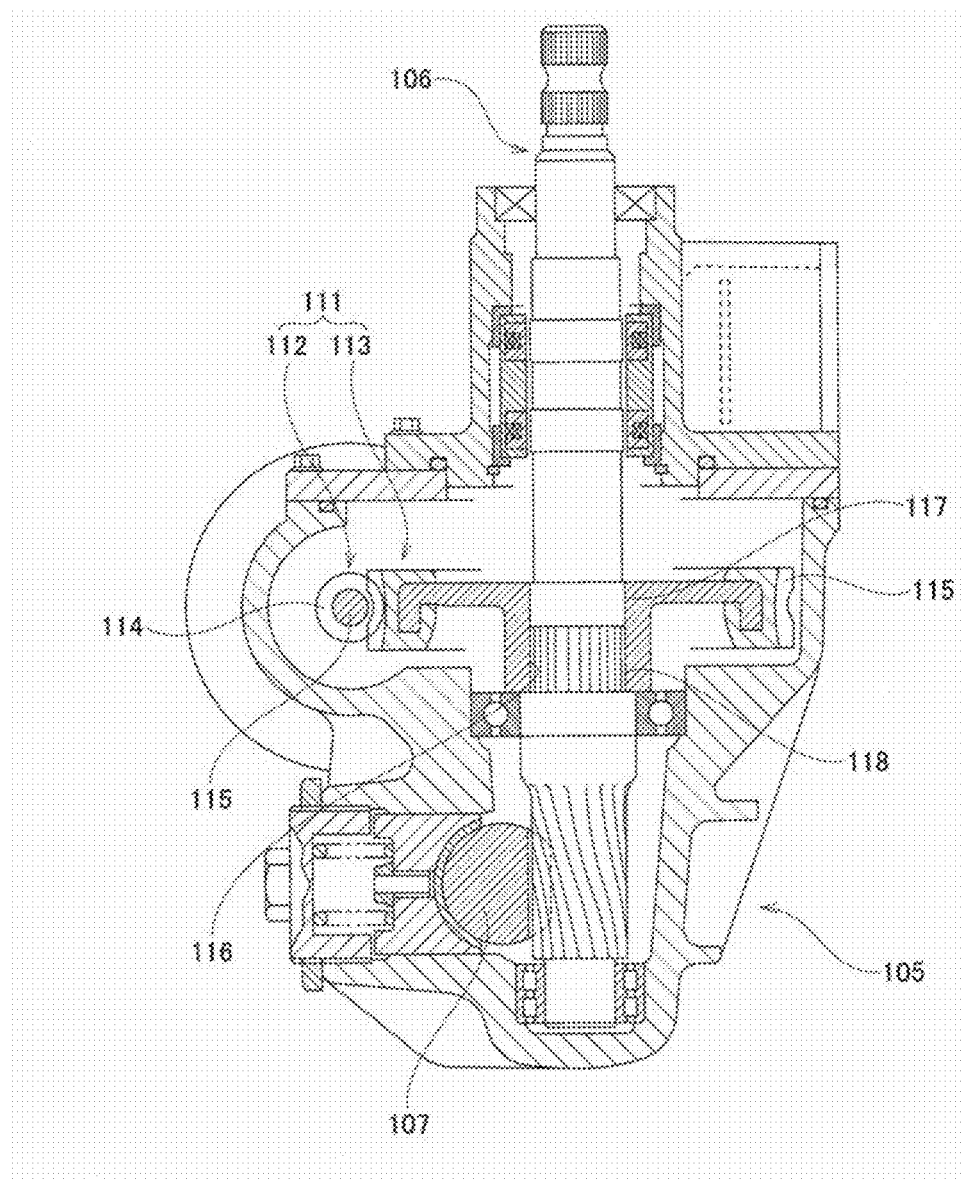
FIG. 16 is a cross-sectional view of main parts of the example of the conventional structure illustrated in FIG. 15.

In this example, the guide shaft portion 26 of the pinion shaft 8 for performing axial alignment with the worm wheel 29 is internally fitted in the center hole 30 of the worm wheel 29 with a clearance fit. Therefore, the dimensional tolerance of the center hole 30, the dimensional tolerance of the serrated shaft portion 25, and the dimensional tolerance of the guide shaft portion 26 do not need to be strictly regulated to the extent performed in the conventional structure as illustrated in FIG. 16 in which both a cylindrical shaft portion 117 for axial alignment with the worm wheel 113 and a serrated shaft portion 118 for ensuring the strength of connection with the worm wheel 113 are press-fitted into the center hole 116 of the worm wheel 113. Therefore, it is possible to suppress an increase in manufacturing cost of the assembly 50 of the pinion shaft 8 and the worm wheel 29.

In the present example, by forming raw male serrations, the outer diameter of which does not change in the axial direction, on the outer peripheral surface of the portion where the serrated shaft portion 25 and the guide shaft portion 26 are to be formed, then polishing with a formed guide shaft portion with a formed grindstone having a stepped cylindrical outer peripheral surface, the outer peripheral surface of the serrated shaft portion 25 and the outer peripheral surface of the guide shaft portion 26 are finished at the same time. Therefore, it is possible to accurately regulate the difference between the outer diameter $D_{25}$ of the serrated shaft portion 25 and the outer diameter $D_{26}$ of the guide shaft portion 26, and with a high degree of precision, it is possible to both perform shaft alignment by fitting the guide shaft portion 26 and the center hole 30 with a clearance fit, and ensure bonding strength by press-fitting the serrated shaft portion 25 into the center hole 30.

However, after raw male serrations, the outer diameter of which does not change in the axial direction, are formed on the outer peripheral surface of the portion where the serrated shaft portion 25 and the guide shaft portion 26 are to be formed, it is possible to polish the tips of the teeth of a portion on one side in the axial direction of the raw male serrations, and the tips of the teeth of a portion on the other side in the axial direction with separate grindstones or at different times. In this case, the feed amount of the grindstone for polishing the tips of the teeth of the portion on the one side in the axial direction where the guide shaft portion 26 is formed is made to be greater than the feed amount of the grindstone for polishing the tips of the teeth of the portion on the other side in the axial direction where the serrated shaft portion 25 is formed. Note that it is also possible not to polish the portion on the other side in the axial direction where the serrated shaft portion 25 is formed.

In this example, a first chamfered portion 43 is provided on the inner peripheral surface of an end portion on the other side in the axial direction of the center hole 30, and provided is a second chamfered portion 44 having a chamfer angle $\theta_2$ smaller than the chamfer angle $\theta_1$ of the first chamfered portion 43 on the inner peripheral surface of a portion adjacent to the one side in the axial direction of the first chamfered portion 43. Therefore, even in a case where the central axis of the pinion shaft 8 is slightly inclined or deviated with respect to the central axis of the worm wheel 29 in a state in which the guide shaft portion 26 and the center hole 30 are fitted with a clearance fit, it is possible to correct the inclination and/or deviation of the central axis of the pinion shaft 8 with respect to the central axis of the worm wheel 29 when press-fitting the serrated shaft portion 25 into the center hole 30. That is, as the pinion shaft 8 is further displaced toward the one side in the axial direction with respect to the worm wheel 29 from a state in which the guide shaft portion 26 and the center hole 30 are fitted with a clearance fit, the outer peripheral surface of the end portion on the one side in the axial direction of the serrated shaft portion 25 is guided by the first chamfered portion 43 and the second chamfered portion 44 so that the inclination and/or deviation of the central axis of the pinion shaft 8 with respect to the central axis of the worm wheel 29 is corrected. From this aspect as well, it is easy to ensure coaxiality between the pinion shaft 8 and the worm wheel 29.

In this example, an auxiliary guide shaft portion 27 having an outer diameter $D_{27}$ smaller than the outer diameter $D_{26}$ of the guide shaft portion 26 is provided at the portion adjacent to the one side in the axial direction of the guide shaft portion 26. By fitting the auxiliary guide shaft portion 27 and the center hole 30 with a clearance fit having little looseness at the initial stage of work for connecting the pinion shaft 8 and the worm wheel 29, that is, before the guide shaft portion 26 and the center hole are fitted with a clearance fit to align the worm wheel 29 and the pinion shaft 8 with high precision, it is possible to perform rough alignment between the worm wheel 29 and the pinion shaft 8. Therefore, the work of connecting the pinion shaft 8 and the worm wheel 29 can be simplified.

In other words, the gap in the radial direction between the outer peripheral surface of the guide shaft portion 26 and the inner peripheral surface of the center hole 30 is extremely small. For this reason, in a structure that does not include an auxiliary guide shaft portion, it is necessary to make the central axis of the pinion shaft and the worm wheel coincide with a high degree of accuracy before starting the work of connecting the pinion shaft and the worm wheel. Otherwise, the guide shaft cannot be inserted into the center hole. However, in the present example, the work of inserting the guide shaft portion 26 into the central hole 30 can be started after the worm wheel 29 and the pinion shaft 8 have been roughly aligned with each other by fitting the auxiliary guide shaft portion 27 and the center hole with a clearance fit with little looseness. In short, it is not necessary to make the central axis of the pinion shaft 8 and the central axis of the worm wheel 29 coincide with such high accuracy before starting the work of connecting the pinion shaft 8 and the worm wheel 29. Therefore, the work of connecting the pinion shaft 8 and the worm wheel 29 can be simplified.

Note that in this example, the outer peripheral surface of the auxiliary guide shaft portion 27 is configured by a cylindrical surface having an outer diameter $D_{27}$ that does not change in the axial direction except for the chamfered portion 32 provided at the end portion on the one side in the axial direction. However, the outer peripheral surface of the auxiliary guide shaft portion can also be configured by a truncated cone surface having an outer diameter that increases as going toward the other side in the axial direction. In this case, the outer diameter of the end portion on the other side in the axial direction of the auxiliary guide shaft portion is made smaller than the outer diameter of the guide shaft portion.

Alternatively, in a case where the central axis of the pinion shaft and the central axis of the worm wheel can be made to coincide with high accuracy before starting the work of connecting the pinion shaft and the worm wheel, it is possible to omit the auxiliary guide shaft portion.

In this example, the portion of the pinion shaft 8 on the one side in the axial direction of the guide shaft portion 26 for performing axial alignment with the worm wheel 29 is located further on the one side in the axial direction than the center hole 30. In other words, the portion on the one side in the axial direction of the guide shaft portion 26 protrudes toward the one side in the axial direction from an opening on the one side in the axial direction of the center hole 30. Therefore, it is easy to secure the fitting length between the serrated shaft portion 25 and the center hole 30 for ensuring the strength of the connection with the worm wheel 29. Accordingly, sufficient strength of connection between the pinion shaft 8 and the worm wheel 29 can be ensured.

Figure 15:
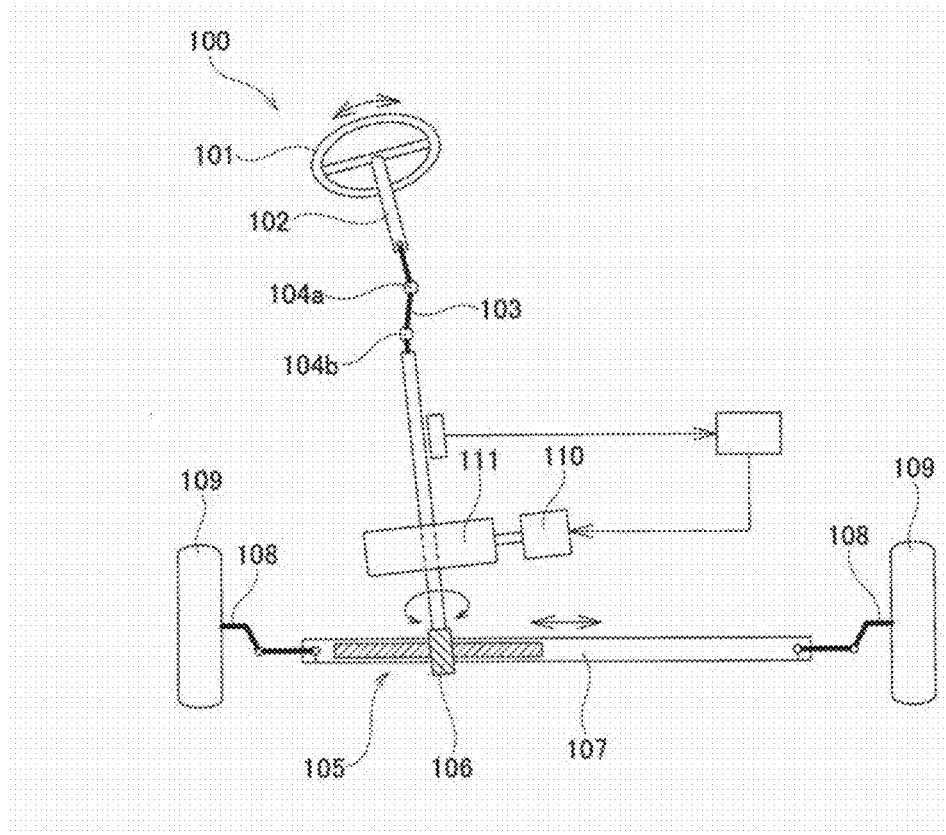
FIG. 15 is a schematic diagram illustrating an example of a conventional structure of a pinion-assist type electric power steering device.

However, in the conventional structure illustrated in FIG. 15 and FIG. 16, of the pinion shaft 106, the full length in the axial direction of not only the serrated shaft portion 118 for ensuring the strength of connection with the worm wheel 113, but also of the cylindrical shaft portion 117 for performing axial alignment with the worm wheel 113 is fitted with a center hole 116 of the worm wheel 113. Therefore, it is difficult to ensure a fitting length between the serrated shaft portion 118 and the center hole 116, and there is a possibility that sufficient strength of connection between the pinion shaft 106 and the worm wheel 113 will not be ensured.

On the other hand, in the conventional structure, in a case where the length in the axial direction of the serrated shaft portion 118 is sufficiently ensured in order to ensure the strength of connection between the pinion shaft 106 and the worm wheel 113, the length in the axial direction of the cylindrical shaft portion 117 is shortened, and during the work of connecting the pinion shaft 106 and the worm wheel 113, there is a possibility that the pinion shaft 106 will not be sufficiently aligned with the worm wheel 113.

Second Example

Figure 7:
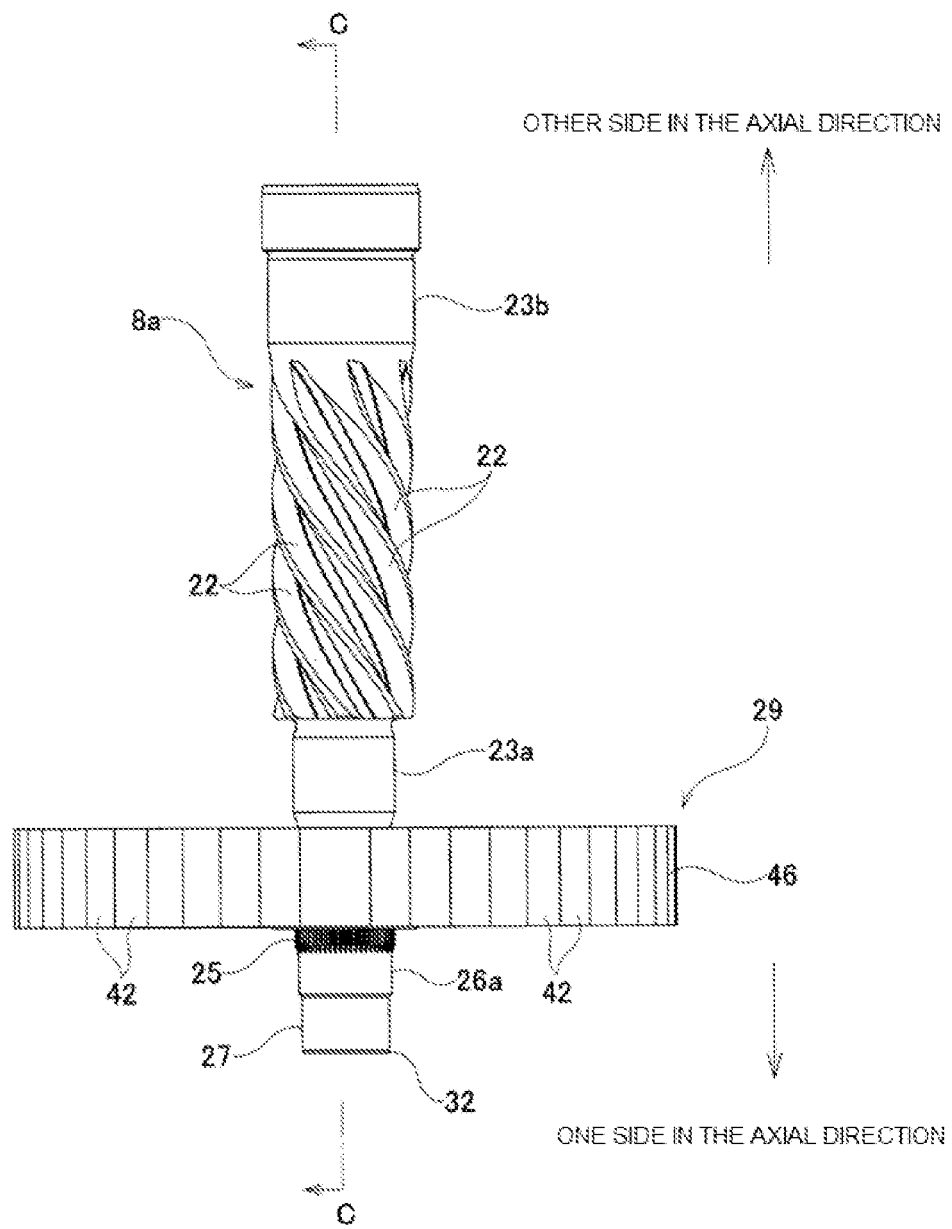
FIG. 7 is a side view illustrating an assembly of a worm wheel and a pinion shaft according to a second example of an embodiment of the present invention.
Figure 8:
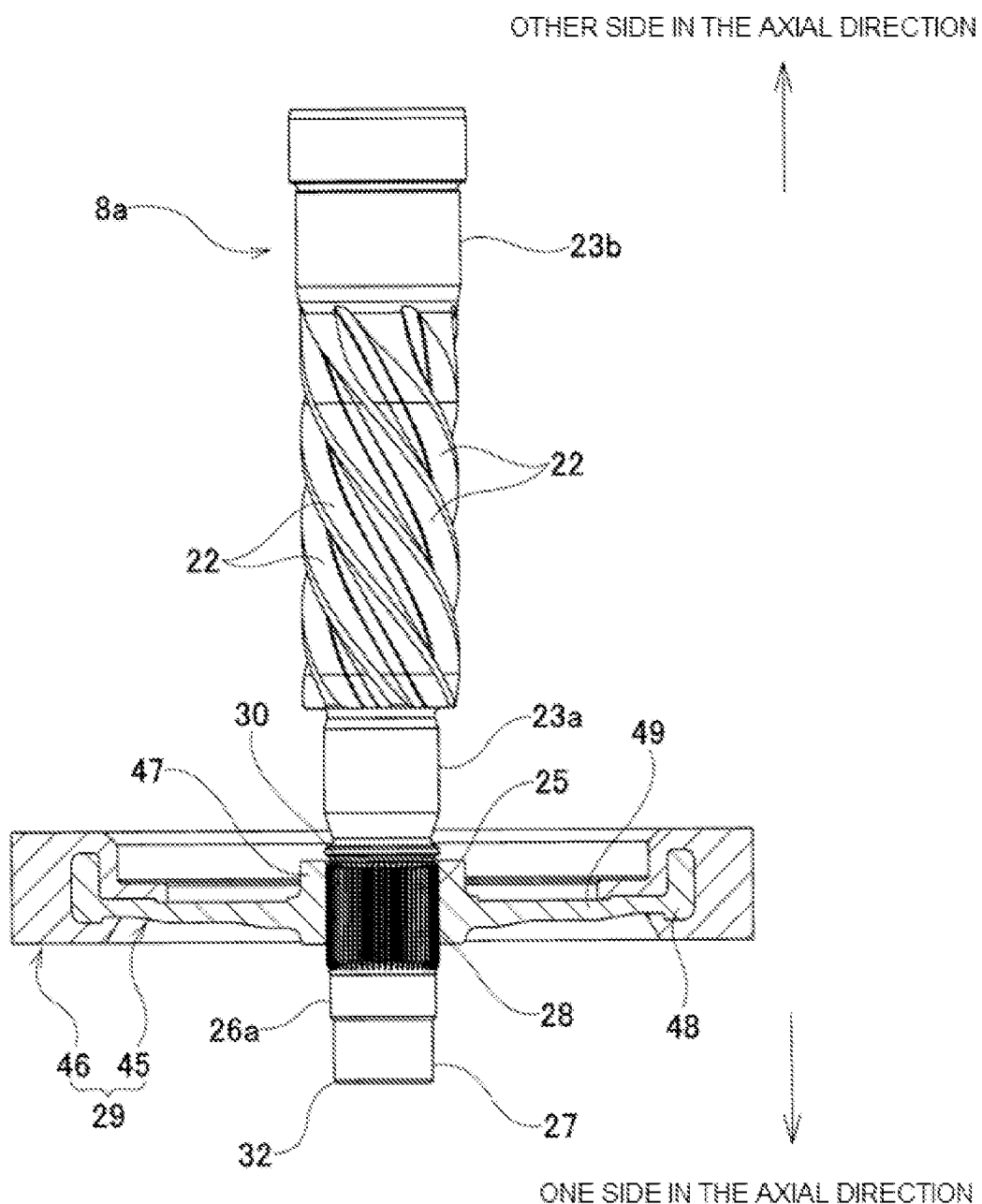
FIG. 8 is a cross-sectional view taken along section line C-C in FIG. 7.

FIG. 7 and FIG. 8 illustrate a second example of an embodiment of the present invention. In this example, a serrated shaft portion 25 of a pinion shaft 8a and a center hole 30 of a worm wheel 29 are fitted over an entire length in the axial direction. In other words, only the serrated shaft portion 25 of the pinion shaft 8a is press-fitted into the center hole 30 of the worm wheel 29, and an entire length in the axial direction of a guide shaft portion 26a is located further on the one side in the axial direction than the center hole 30 of the worm wheel 29. That is, the entire length in the axial direction of the guide shaft portion 26a protrudes toward the one side in the axial direction from an opening on the one side in the axial direction of the center hole 30.

In addition, in this example, an outer peripheral surface of the guide shaft portion 26a of the pinion shaft 8a is formed of a cylindrical surface, an outer diameter of which does not change in the axial direction, except for both ends in the axial direction that are a connection portion with the serrated shaft portion 25 and a connection portion with an auxiliary guide shaft portion 27.

In this example, the serrated shaft portion 25 of the pinion shaft 8a and the center hole 30 of the worm wheel 29 are fitted in the axial direction, and thus it is possible to make the strength of connection between the pinion shaft 8a and the worm wheel 29 higher than in the first example. Other configurations and effects are the same as those of the first example.

Third Example

Figure 9:
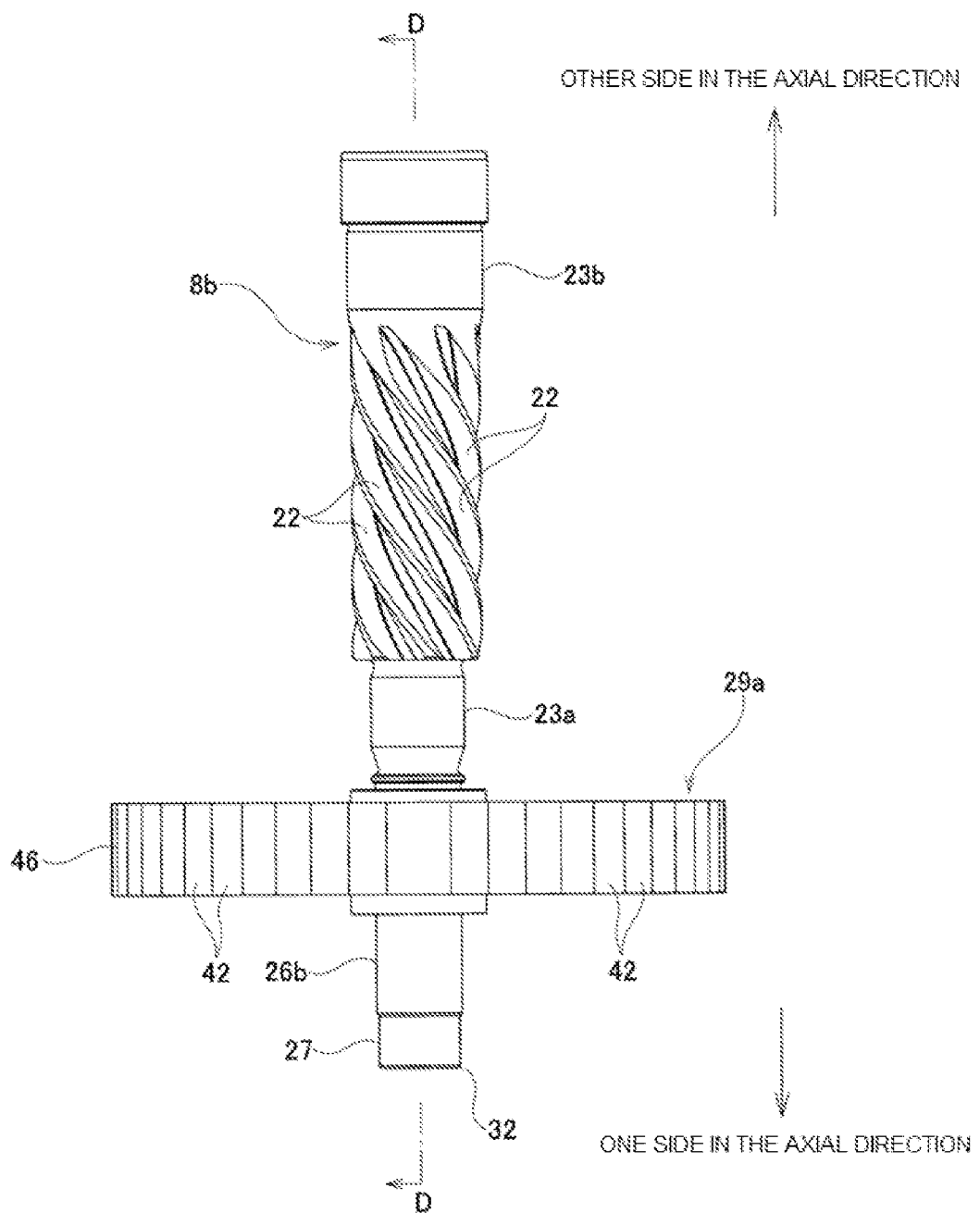
FIG. 9 is a side view illustrating an assembly of a worm wheel and a pinion shaft according to a third example of an embodiment of the present invention.
Figure 10:
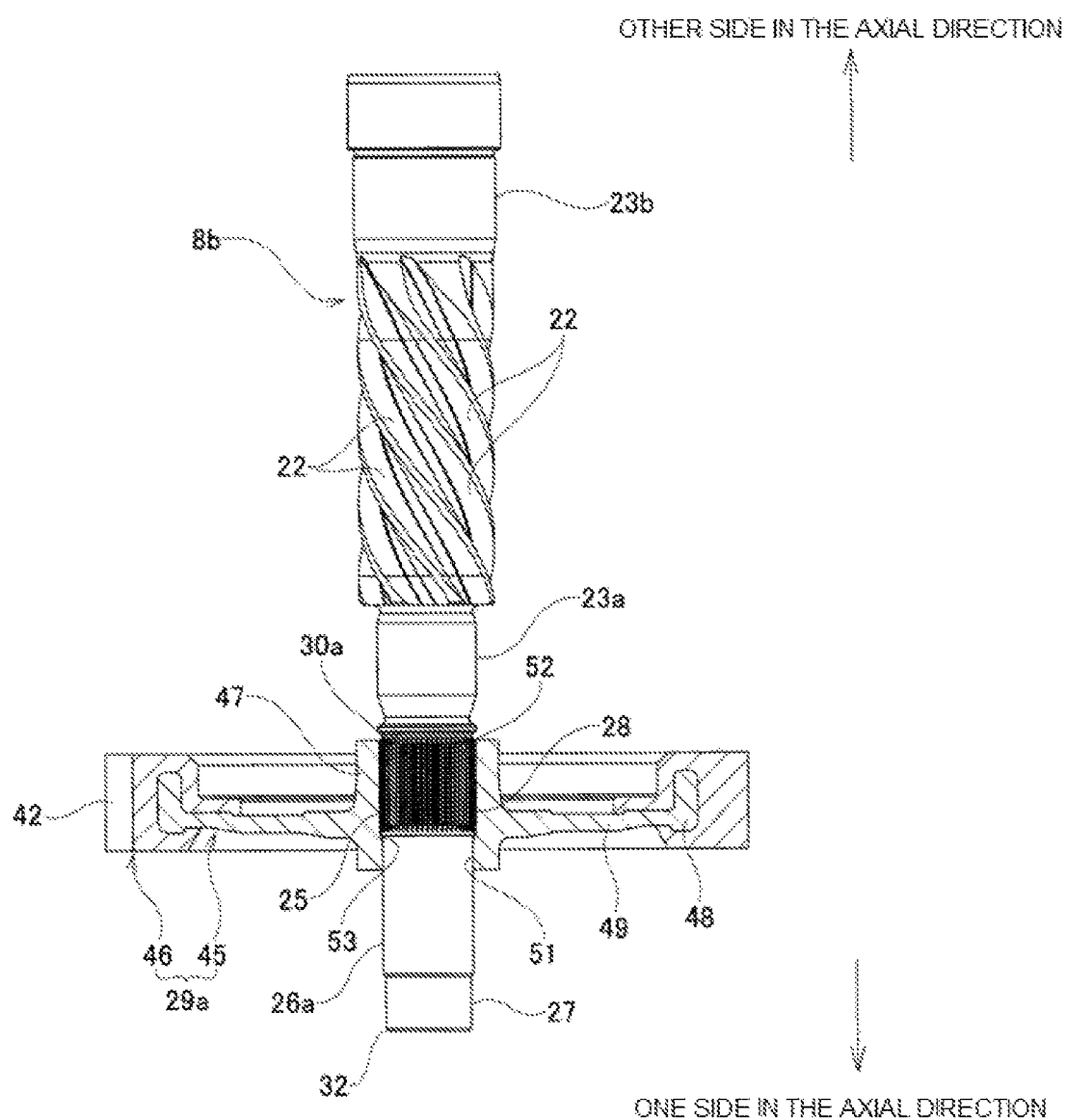
FIG. 10 is a cross-sectional view taken along section line D-D in FIG. 9.
Figure 11:
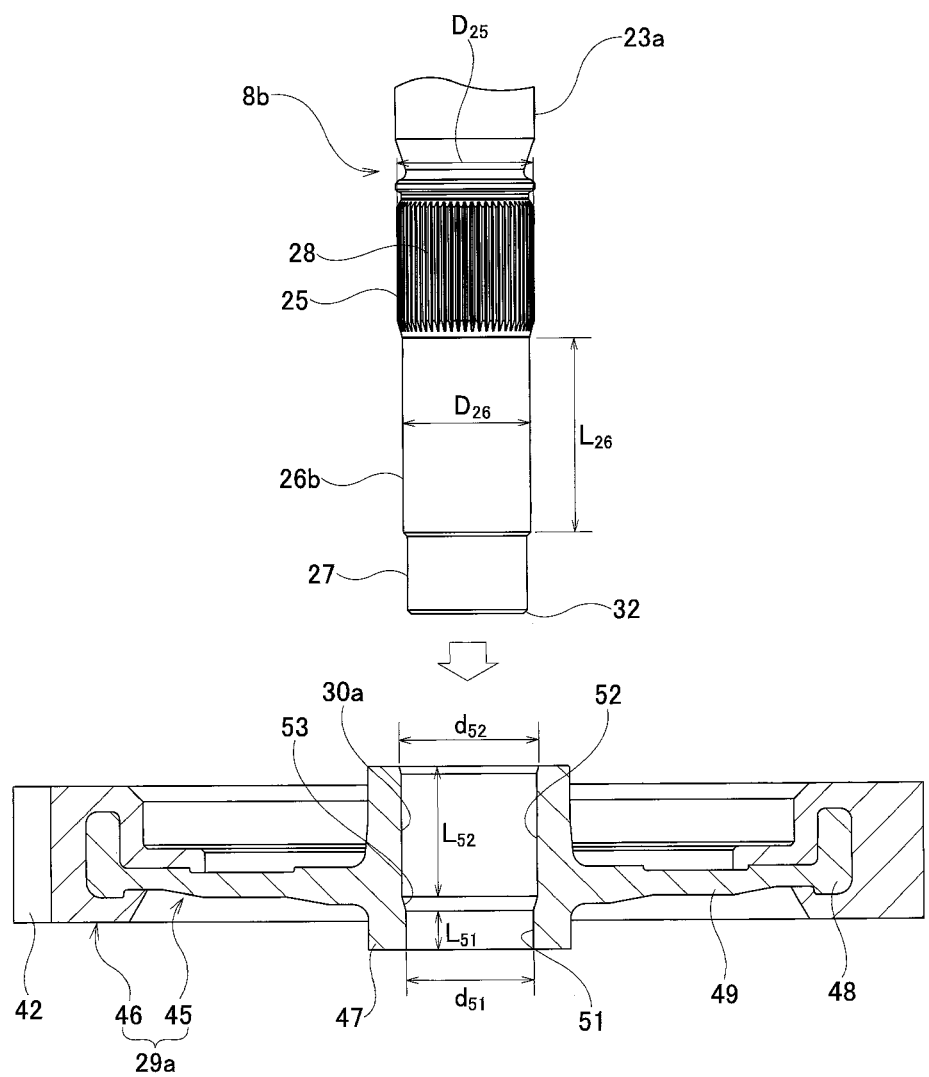
FIG. 11 is a view corresponding to FIG. 5 of the assembly of the worm wheel and pinion shaft of the third example.

FIG. 9 to FIG. 11 illustrate a third example of an embodiment of the present invention. In this example, a center hole 30a provided in a worm wheel 29a has a small diameter portion 51 on the one side in the axial direction, and on the other side in the axial direction, has a large diameter portion 52 having an inner diameter $d_{52}$ larger than an inner diameter $d_{51}$ of the small diameter portion 51. The small diameter portion 51 and the large diameter portion 52 are connected by an inclined surface portion 53 in a shape of a truncated cone inclined in a direction in which the inner diameter decreases as going toward the one side in the axial direction. That is, the center hole 30a is configured as a stepped hole. The inner diameter $d_{51}$ of the small diameter portion 51 and the inner diameter $d_{52}$ of the large diameter portion 52 are not particularly limited, and may be of any size.

A length $L_{51}$ in the axial direction of the small diameter portion 51 and a length $L_{52}$ in the axial direction of the large diameter portion 52 are not particularly limited as long as it is possible to ensure the strength of connection between the pinion shaft 8b and the worm wheel 29; however, the length $L_{52}$ in the axial direction of the large diameter portion 52 is preferably 0.3 times or more to 1.0 times or less, and more preferably 0.5 times or more to 0.8 times or less the axial length $L_{51}$ of the small diameter portion 51.

Further, the pinion shaft 8b, at a portion further on the one side in the axial direction than a cylindrical surface portion 23a on the one side in the axial direction of a pair of cylindrical surface portions 23a, 23b, has in order from the other side in the axial direction, a serrated shaft portion 25, a guide shaft portion 26b, and an auxiliary guide shaft portion 27.

The serrated shaft portion 25, of the center hole 30a of the worm wheel 29a, has an outer diameter $D_{25}$ slightly larger than the inner diameter $d_{52}$ of the large diameter portion 52. More specifically, in a state before the serrated shaft portion 25 is press-fitted into the large diameter portion 52, the outer diameter $D_{25}$ of the serration shaft portion 25 is larger than the inner diameter $d_{52}$ of the large diameter portion 52 by 0.5% or more to 1.5% or less, and preferably 0.7% or more to 1.0% or less.

In this example, the outer peripheral surface of the guide shaft portion 26b is formed of a cylindrical surface, the outer diameter of which does not change in the axial direction, except for the end portions on both sides in the axial direction that are the connection portion with the serrated shaft portion 25 and the connection portion with the auxiliary guide shaft portion 27.

The guide shaft portion 26b has an outer diameter that allows the guide shaft portion 26b to be internally fitted in the small diameter portion 51 of the center hole 30a of the worm wheel 29a with a clearance fit. That is, the guide shaft portion 26b has an outer diameter $D_{26}$ slightly smaller than the inner diameter $d_{51}$ of the small diameter portion 51. More specifically, the outer diameter $D_{26}$ of the guide shaft portion 26 is smaller than the inner diameter $d_{51}$ of the small diameter portion 51 by 0.01% or more to 0.5% or less, and preferably by 0.01% or more to 0.2% or less.

In addition, the length $L_{26}$ in the axial direction of the guide shaft portion 26b is longer than the length $L_{52}$ in the axial direction of the large diameter portion 52 of the center hole 30a. More specifically, the length $L_{26}$ in the axial direction of the guide shaft portion 26b is 1.2 times or more to 2.0 times or less, and preferably 1.2 times or more to 1.5 times or less the length $L_{52}$ in the axial direction of the large diameter portion 52. As a result, during the work of connecting the pinion shaft 8b and the worm wheel 29a (to be described later), the serrated shaft portion 25 is prevented from being press-fitted into the large-diameter portion 52 before the guide shaft portion 26b and the small-diameter portion 51 are fitted with a clearance fit without looseness.

When connecting the pinion shaft 8b and the worm wheel 29a, as indicated by the white arrow in FIG. 11, the pinion shaft 8b is inserted into the center hole 30a of the worm wheel 29a with the one side in the axial direction leading. The auxiliary guide shaft portion 27 and the small diameter portion 51 are fitted together with a clearance fit having little looseness. As a result, the central axis of the pinion shaft 8b and the central axis of the worm wheel 29a are made to substantially coincide, and the pinion shaft 8b and the worm wheel 29a are roughly aligned.

From this state, the pinion shaft 8b is further displaced toward the one side in the axial direction with respect to the worm wheel 29a, and the guide shaft portion 26 and the small diameter portion 51 are fitted together with a clearance fit without looseness. As a result, the central axis of the pinion shaft 8b and the central axis of the worm wheel 29b are made to coincide with high accuracy, and the pinion shaft 8b and the worm wheel 29a are aligned with high accuracy.

From a state in which the guide shaft portion 26b and the small diameter portion 51 are fitted together, the pinion shaft 8b is further displaced toward the one side in the axial direction with respect to the worm wheel 29a, and the serrated shaft portion 25 is press-fitted into the large diameter portion 52, to connect and fix the pinion shaft 8b and the worm wheel 29a.

According to this example, it is possible to make the inner diameter of the center hole 30a of the worm wheel 29a different at the small diameter portion 51 for performing axial alignment with the pinion shaft 8b and at the large diameter portion 52 for ensuring the strength of the connection with the pinion shaft 8b. Therefore, the dimensional tolerance of the inner diameter $D_{51}$ of the small-diameter portion 51 can be restricted by just the relationship with the outer diameter $D_{26}$ of the guide shaft portion 26b without having to consider the relationship with the outer diameter $D_{25}$ of the serrated shaft portion 25. In addition, the dimensional tolerance of the inner diameter $D_{52}$ of the large diameter portion 52 can be regulated by the relationship with the outer diameter $D_{25}$ of the serrated shaft portion without having to consider the relationship with the outer diameter $D_{26}$ of the guide shaft portion 26b. Other configurations and effects are the same as those of the first embodiment.

Fourth Example

Figure 12:
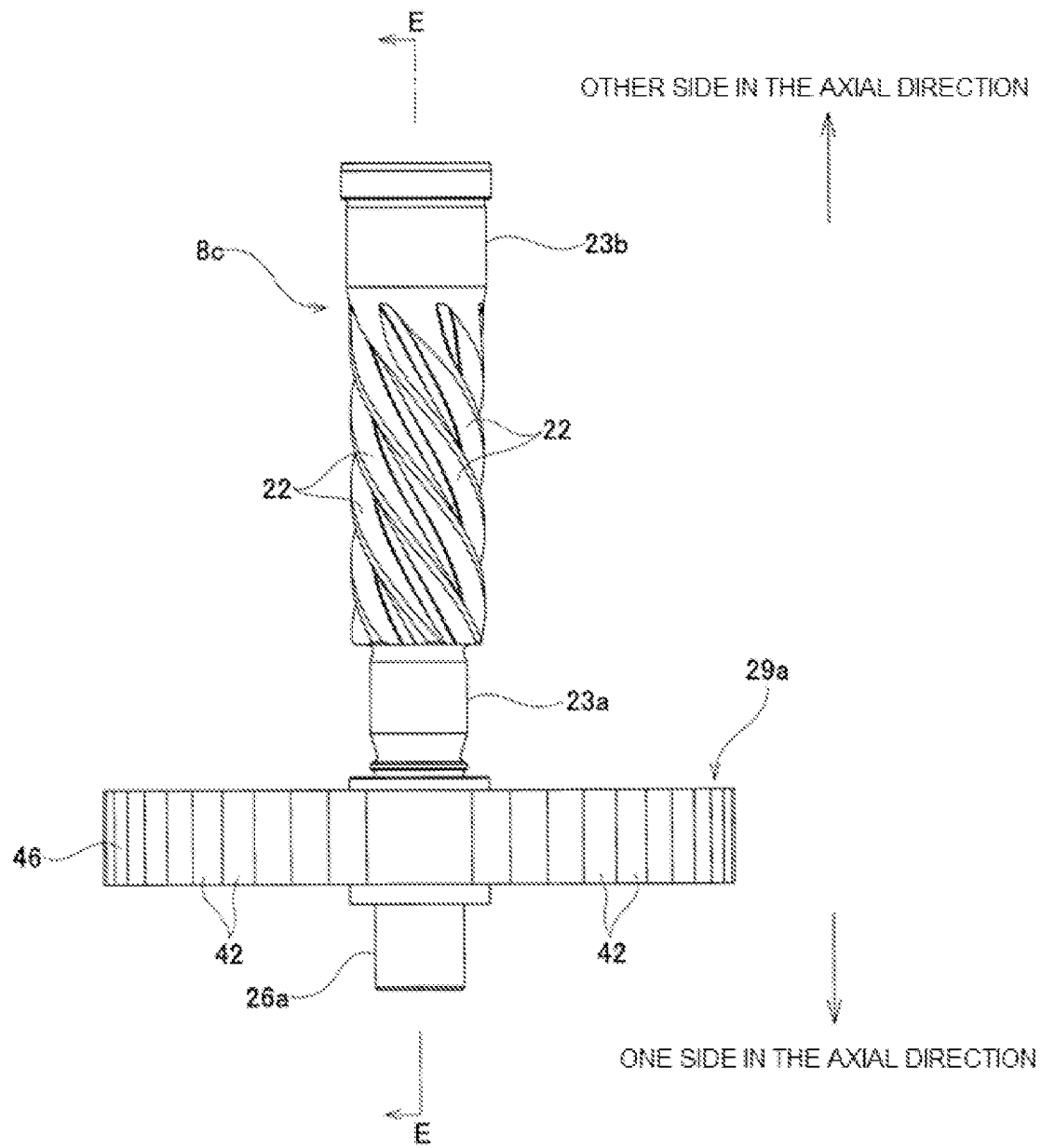
FIG. 12 is a side view illustrating an assembly of a worm wheel and a pinion shaft according to a fourth example of an embodiment of the present invention.
Figure 13:
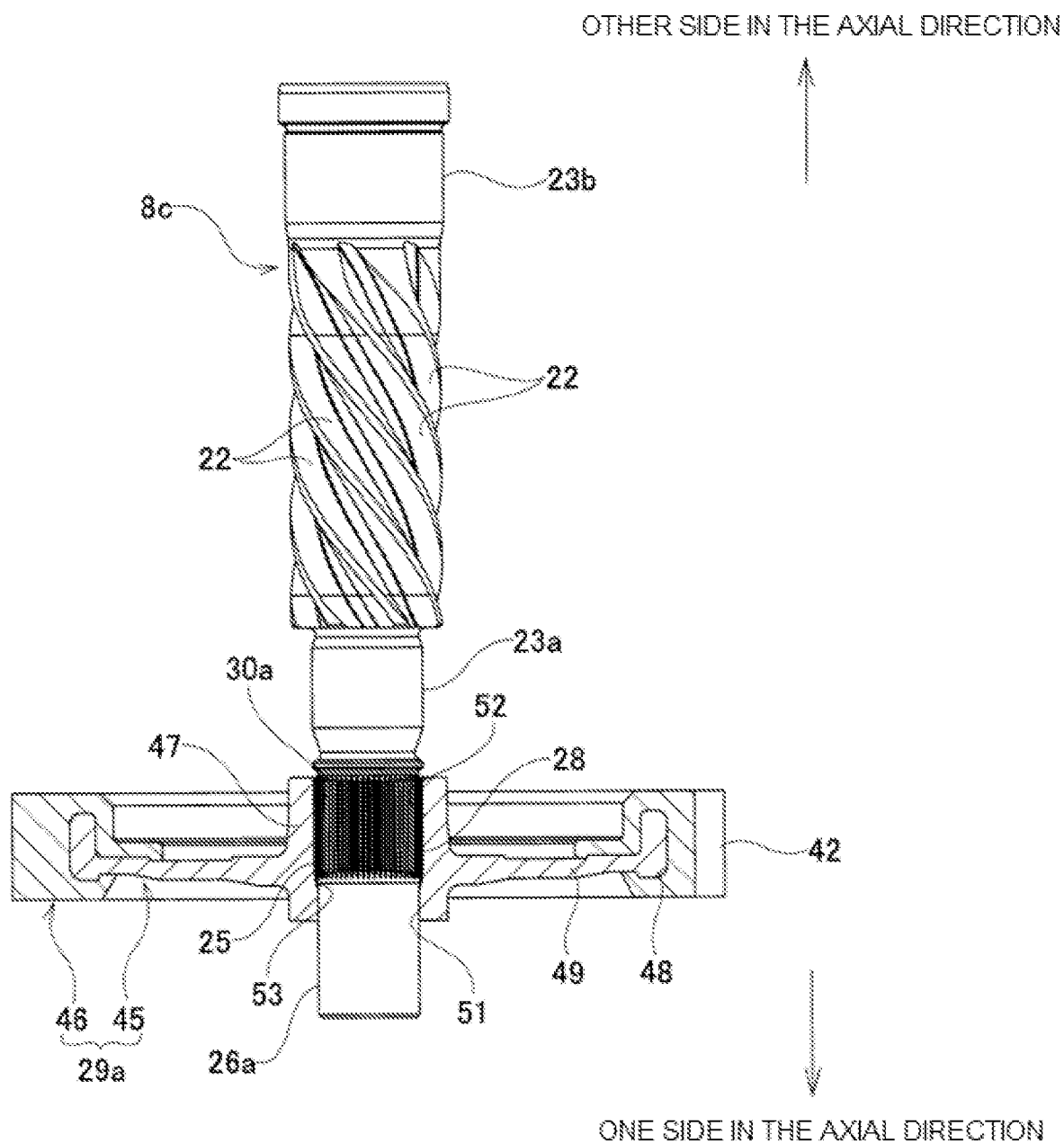
FIG. 13 is a cross-sectional view taken along section line E-E in FIG. 12.
Figure 14:
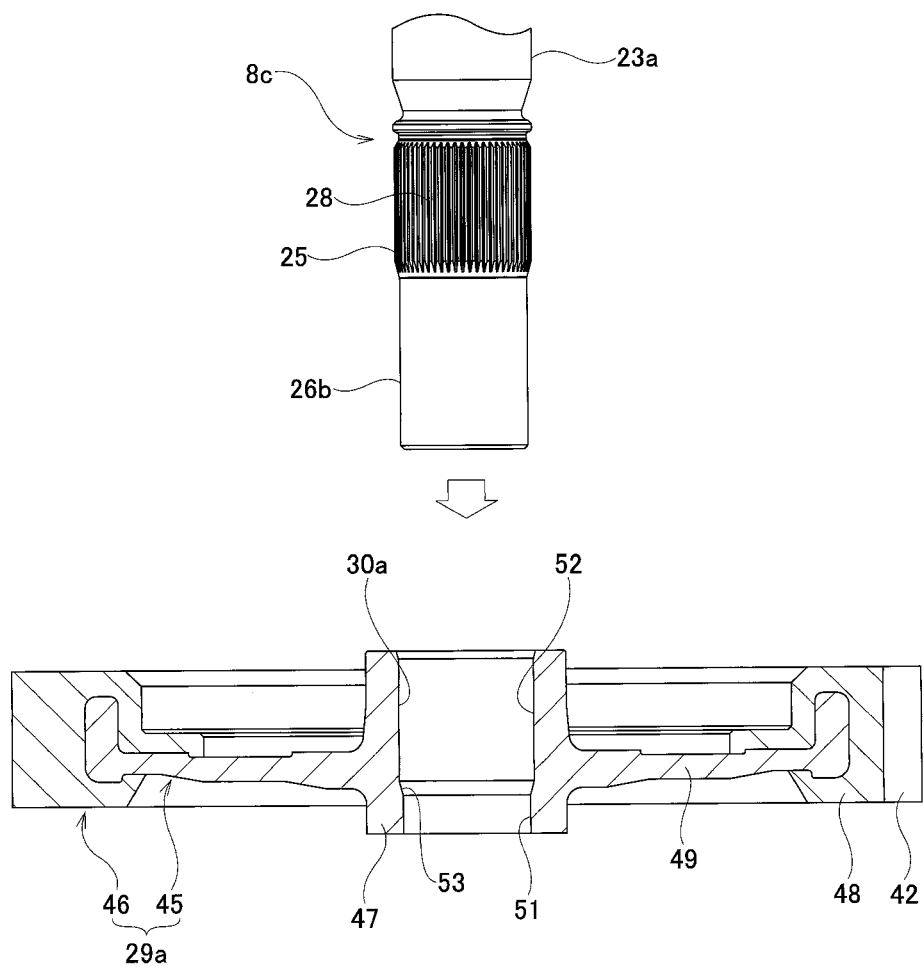
FIG. 14 is a view corresponding to FIG. 5 of the assembly of the worm wheel and pinion shaft of the fourth example.

FIG. 12 to FIG. 14 illustrate a fourth example of an embodiment of the present invention. In this example, a center hole 30a provided in a worm wheel 29a is a stepped hole having a small diameter portion 51 on the one side in the axial direction and a large diameter portion 52 on the other side in the axial direction.

Further, a pinion shaft 8c, at a portion further on the one side in the axial direction than a cylindrical surface portion 23a on the one side in the axial direction of a pair of cylindrical surface portions 23a, 23b, has in order from the other side in the axial direction, a serrated shaft portion 25, and a guide shaft portion 26b. In other words, the pinion shaft 8c of the present example is the pinion shaft 8b of the third example with the auxiliary guide shaft portion 27 omitted. Therefore, it is possible to suppress the amount of protrusion of the pinion shaft 8c from an opening on the one side in the axial direction of the center hole 30a of the worm wheel 29a. Other configurations and effects are the same as those of the first embodiment.

Examples of embodiments of the present invention have been described above; however, the present invention is not limited to the embodiments and may be modified as appropriate without departing from the technical idea of the invention. In addition, the first to fourth examples may be combined as appropriate within a range that does not cause contradiction.

In the first to fourth examples, an assembly 50 is described in which the worm wheel 29 is supported by and fixed to a portion of the pinion shaft 8, 8a, 8b located further on the tip end side than the intermediate portion in the axial direction provided with the pinion teeth 22. However, the present invention may also be applied to an assembly in which the worm wheel is supported by and fixed to a portion of the pinion shaft that is positioned further on the base end side than the intermediate portion in the axial direction provided with the pinion teeth.

In the first to fourth examples, examples are described in which the present invention is applied to an assembly 50 that includes a pinion shaft 8, 8a, 8b of a steering gear unit 6, and a worm wheel 29, 29a of a worm speed reducer 19 of a pinion-assist type electric power steering device 1, and to an assembly method thereof. However, the present invention may also be applied to an assembly of a rotating shaft and a worm wheel of an electric power steering device other than a pinion-assist type, and to an assembly method thereof. That is, in a case of a column-assist type electric power steering device, the present invention may be applied to an assembly of a steering shaft and a worm wheel supported by and fixed to the steering shaft, and to an assembly method thereof. In a case of a dual-pinion type electric power steering device, the present invention may be applied to an assembly of a second pinion shaft that is separate from a pinion shaft that is connected to a steering shaft so as to be able to transmit torque and that engages with a rack shaft and a worm wheel supported by and fixed to the second pinion shaft, and to an assembly method thereof.

In addition, the present invention is not limited to an electric power steering device, and may also be applied to an assembly of a rotary shaft of a worm speed reducer and a worm wheel of various machines, and to an assembly method thereof. Furthermore, the present invention is not limited to an assembly of a rotating shaft and a worm wheel and to an assembly method thereof, and may also be applied to an assembly of a rotating shaft and a gear other than a worm wheel, such as a spur gear, and to an assembly method thereof.

REFERENCE SIGNS LIST

1 Electric power steering device
2 Steering wheel
3 Steering shaft
4A, 4B Universal joint
Intermediate shaft
6 Steering gear unit
7 Electric-assist device
8, 8A, 8B Pinion shaft
9 Housing
Rack shaft
11 Rack guide
12 Tie rod
13 Steered wheels
14 Rack housing portion
Pinion housing portion
16 Guide housing portion
17 Gear housing portion
18 Attachment portion
19 Worm speed reducer
20 Wheel housing portion
21 Worm housing portion
22 Pinion teeth
23a, 23b Cylindrical surface portion
24a, 24b Bearing
25 Serrated shaft portion
26, 26a, 26b Guide shaft portion
27 Auxiliary guide shaft portion
28 Male serration portion
29, 29a Worm wheel
30, 30a Center hole
31 Male serration portion
32 Chamfered portion
33 Hollow shaft
34 Torsion bar
35 Rack teeth
36 Pad
36a Pressing surface
37 Elastic member
38 Cap
39 Electric motor
40 Torque sensor
41 Worm
42 Wheel teeth
43 First chamfered portion
44 Second chamfered portion
45 Hub
46 Gear portion
47 Inner diameter side tubular portion
48 Outer diameter side tubular portion
49 Connecting portion
50 Assembly
51 Small diameter portion
52 Large diameter portion
53 Inclined surface portion
100 Electric power steering device
101 Steering wheel
102 Steering shaft
103 Intermediate shaft
104a, 104b Universal joint
105 Steering gear unit
106 Pinion shaft
107 Rack shaft
108 Tie rod
109 Steered wheels
110 Electric motor
111 Worm speed reducer
112 Worm
113 Worm wheel
114 Worm tooth
115 Wheel teeth
116 Center hole
117 Cylindrical shaft portion
118 Serrated shaft portion

The invention claimed is:

1. An assembly of a gear and rotating shaft, comprising:
the gear, the rotating shaft, and a first side and a second side with respect to an axial direction thereof,
the gear having teeth on an outer peripheral surface thereof, and a center hole having an inner peripheral surface penetrating in the axial direction through a center portion thereof, the inner peripheral surface of the center hole comprising a cylindrical surface; and
the rotating shaft assembled with the rotating shaft inserted into the center hole from a second side of the center hole toward a first side of the center hole with respect to the axial direction with an end portion on a first side of the rotating shaft leading towards the first side of the assembly with respect to the axial direction,
wherein the rotating shaft includes a serrated shaft portion having a male serration portion on an outer peripheral surface thereof and press-fitted into the center hole with an interference fit against the cylindrical surface of the inner peripheral surface of the center hole, and a guide shaft portion provided adjacent to the serrated shaft portion on the first side of the rotating shaft with respect to the axial direction and having an outer diameter capable of being internally fitted in the center hole with a clearance fit such that a minute gap exists between the inner peripheral surface of the center hole and an outer peripheral surface of at least a portion of the guide shaft portion in an assembled state of the assembly, and wherein the center hole has a first chamfered portion at an end portion of the inner peripheral surface of the center hole on the second side of the center hole with respect to the axial direction, and a second chamfered portion at a portion of the inner peripheral surface adjacent to the first chamfered portion, the second chamfered portion having a smaller chamfer angle than the first chamfered portion.

2. The assembly of the gear and rotating shaft according to claim 1, wherein the outer peripheral surface of the guide shaft portion comprises a male serration portion of which an addendum circle diameter is smaller than an addendum circle of the male serration portion of the serrated shaft portion.

3. The assembly of the gear and rotating shaft according to claim 1, wherein the outer peripheral surface of the guide shaft portion comprises a cylindrical surface.

4. The assembly of the gear and rotating shaft according to claim 1, wherein the rotating shaft further includes a sub-guide shaft portion provided at an end of the guide shaft portion on the first side of the rotating shaft with respect to the axial direction, the sub-guide shaft portion having an outer diameter smaller than the outer diameter of the guide shaft portion.

5. The assembly of the gear and rotating shaft according to claim 1, wherein the guide shaft portion has a length with respect to the axial direction of 0.3 times or more a length of the center hole with respect to the axial direction.

* * * * *